(12) United States Patent
Ezra et al.

(10) Patent No.: US 11,998,008 B2
(45) Date of Patent: *Jun. 4, 2024

(54) PESTICIDES AND METHODS OF CONTROLLING PESTS

(71) Applicant: The State of Israel, Ministry of Agriculture & Rural Development, Agricultural Research Organization (ARO) (VOLCANI CENTER), Beit-Dagan (IL)

(72) Inventors: David Ezra, Ein Vered (IL); Orna Liarzi, Rehovot (IL); Ariel Ewenson, Omer (IL)

(73) Assignee: The State of Israel, Ministry of Agriculture & Rural Development, Agricultural Research Organization (ARO) (VOLCANI CENTER), Beit-Dagan (IL)

( * ) Notice: Subject to any disclaimer, the term of this patent is extended or adjusted under 35 U.S.C. 154(b) by 146 days.

This patent is subject to a terminal disclaimer.

(21) Appl. No.: 16/763,034

(22) PCT Filed: Nov. 15, 2018

(86) PCT No.: PCT/IL2018/051235
§ 371 (c)(1),
(2) Date: May 11, 2020

(87) PCT Pub. No.: WO2019/097517
PCT Pub. Date: May 23, 2019

(65) Prior Publication Data
US 2021/0092951 A1  Apr. 1, 2021

Related U.S. Application Data

(60) Provisional application No. 62/586,970, filed on Nov. 16, 2017.

(51) Int. Cl.
*A01N 35/06* (2006.01)
*A01N 25/30* (2006.01)
(Continued)

(52) U.S. Cl.
CPC ............. *A01N 35/06* (2013.01); *A01N 25/30* (2013.01); *A01N 31/02* (2013.01); *A01N 35/02* (2013.01); *A01N 35/04* (2013.01)

(58) Field of Classification Search
CPC ........ A01N 35/06; A01N 25/30; A01N 31/02; A01N 35/02; A01N 35/04; A01N 37/02
See application file for complete search history.

(56) References Cited

U.S. PATENT DOCUMENTS 7,135,449 B2   11/2006  Li et al.
2004/0141955 A1   7/2004  Strobel et al.
(Continued)

FOREIGN PATENT DOCUMENTS

CN   103328639 A       9/2013
EP      0388122   *   3/1990  ............. A01N 25/02
(Continued)

OTHER PUBLICATIONS

Liarzi et al., Use of the Endophytic *Fungus Daldinia* cf. concentrica and Its Volatiles as Bio-Control Agents, PLOS One, 2016, 11.12: e0168242, https://doi.org/10.1371/journal.pone.0168242.
(Continued)

*Primary Examiner* — Trevor Love
(74) *Attorney, Agent, or Firm* — The Roy Gross Law Firm, LLC; Roy Gross

(57) ABSTRACT

Disclosed herein are agricultural biocontrol compounds and compositions comprising the compounds, and methods of using the same. Specifically, nematacide fungicidal and herbecidial compounds, compositions comprising thereof,
(Continued)

and methods for preventing and inhibiting nematodes, fungi and weed growth are disclosed herein.

18 Claims, 19 Drawing Sheets

(51) Int. Cl.
*A01N 31/02* (2006.01)
*A01N 35/02* (2006.01)
*A01N 35/04* (2006.01)

(56) References Cited

U.S. PATENT DOCUMENTS

| | | |
|---|---|---|
| 2004/0185031 A1 | 9/2004 | Strobel et al. |
| 2006/0089263 A1 | 4/2006 | Rodriguez-Kabana et al. |
| 2007/0155830 A1 | 7/2007 | Liu et al. |
| 2007/0202141 A1 | 8/2007 | Jumean et al. |
| 2011/0287471 A1 | 11/2011 | Strobel et al. |
| 2011/0302823 A1 | 12/2011 | Bruck et al. |
| 2013/0005807 A1 | 1/2013 | Ishida et al. |
| 2013/0137131 A1 | 5/2013 | Strobel et al. |
| 2013/0224315 A1 | 8/2013 | Green et al. |
| 2013/0252289 A1 | 9/2013 | Strobel et al. |
| 2013/0252313 A1 | 9/2013 | Strobel et al. |
| 2013/0345053 A1 | 12/2013 | Schreuder et al. |
| 2014/0086879 A1 | 3/2014 | Strobel et al. |
| 2014/0107219 A1 | 4/2014 | Watkins et al. |
| 2014/0271534 A1 | 9/2014 | Wu et al. |
| 2014/0323572 A1 | 10/2014 | Pimentel et al. |
| 2016/0100597 A1 | 4/2016 | Immaraju et al. |

FOREIGN PATENT DOCUMENTS

| | | | | |
|---|---|---|---|---|
| IN | 2012CH04360 A | | 11/2012 | |
| WO | WO2013156492 | * | 10/2013 | ............ A01N 31/02 |
| WO | 2015089661 A1 | | 6/2015 | |
| WO | 2016031775 A1 | | 3/2016 | |
| WO | WO2016/125153 | * | 8/2016 | ............... C12N 1/14 |
| WO | 2017027836 A1 | | 2/2017 | |

OTHER PUBLICATIONS

Liarzi et al., Bioactive volatiles from an endophytic *Daldinia* cf. *concentrica* isolate affect the viability of the plant parasitic nematode *Meloidogyne javanica*. PloS one, 2016, 11.12: e0168437, https://doi.org/10.1371/journal.pone.0168437.

Lu, H. et al., (2017). Nematicidal Activity of trans-2-Hexenal against Southern Root-Knot Nematode (*Meloidogyne incognita*) on Tomato Plants. Journal of Agricultural and Food Chemistry, 65(3), 544-550. DOI: 10.1021/acs.jafc.6b04091.

Kim, J. et al., (2008). Nematicidal Activity of Plant Essential Oils and Components from Coriander (*Coriandrum sativum*), Oriental Sweetgum (*Liquidambar orientalis*), and Valerian (*Valeriana wallichii*) Essential Oils against Pine Wood Nematode (*Bursaphelenchus xylophilus*). Journal of Agricultural and Food Chemistry, 56(16), 7316-7320. Retrieved Aug. 12, 2021; DOI: 10.1021/jf800780f.

Plotto, A. et al., (2003). Evaluation of Plant Essential Oils as Natural Postharvest Disease Control of Tomato (*Iycopersicon esculentum*). Acta Horticulturae, (628), 737-745. Retrieved Aug. 12, 2021; DOI: 10.17660/ActaHortic.2003.628.93.

Caboni, P. et al., (2012). Nematicidal Activity of (E,E)-2,4-Decadienal and (E)-2-Decenal from Ailanthus altissima against Meloidogyne javanica. Journal of Agricultural and Food Chemistry, 60(4), 1146-1151. Retrieved Aug. 12, 2021; dx.doi.org/10.1021/jf2044586.

International Search Report for International Application No. PCT/IL2018/051235, dated Jan. 13, 2019, 3pp.

Written Opinion for International Application No. PCT/IL2018/051235, dated Jan. 13, 2019, 6pp.

International Preliminary Report on Patentability for International Application No. PCT/IL2018/051235, dated Jan. 13, 2019, 7pp.

Riyaz-Ul-Hassan S et al: "An Endophytic *Nodulisporium* sp from Central America Producing Volatile Organic Compounds with Both Biological and Fuel Potential." J. Microbiol. Biotechnol. 2013; 23(1): 29-35. http://dx.doi.org/10.4014/jmb.1208.04062.

Van Andel, O. M. (1962). Fluorophenylalanine as a Systemic Fungicide. Nature, 194(4830), 790-790. doi:10.1038/194790a0.

Costa, R., Dugo, P., Navarra, M., Raymo, V., Dugo, G., & Mondello, L. (2010). Study on the chemical composition variability of some processed bergamot (*Citrus bergamia*) essential oils. Flavour and Fragrance Journal, 25(1), 4-12. doi:10.1002/ffj.1949.

Kubo, A., Lunde, C. S., & Kubo, I. (1995). Antimicrobial Activity of the Olive Oil Flavor Compounds. Journal of Agricultural and Food Chemistry, 43(6), 1629-1633. doi: 10.1021/jf00054a040.

Rahman, A., Sultana Shanta, Z., Rashid, M. A., Parvin, T., Afrin, S., Khodeza Khatun, M., & Sattar, M. A. (2016). In vitro antibacterial properties of essential oil and organic extracts of Premna integrifolia Linn. Arabian Journal of Chemistry, 9, S475-S479. doi:10.1016/j.arabjc.2011.06.003.

Castillo et al., Antifungal Properties of Bioactive Compounds from Plants, Jan. 2012, Fungicides for plant and animal diseas (2012); pp. 81-106.

Megan Kennelly, Tomato leaf and fruit diseases and disorders, May 2009, Kansas State University (2009); L-721.

* cited by examiner

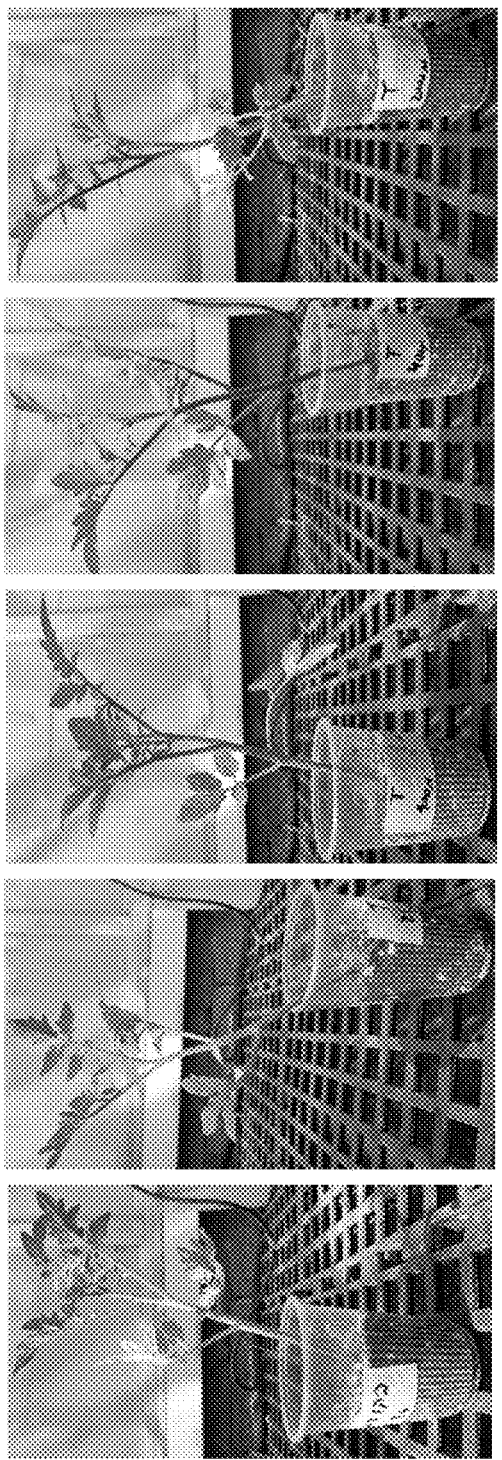
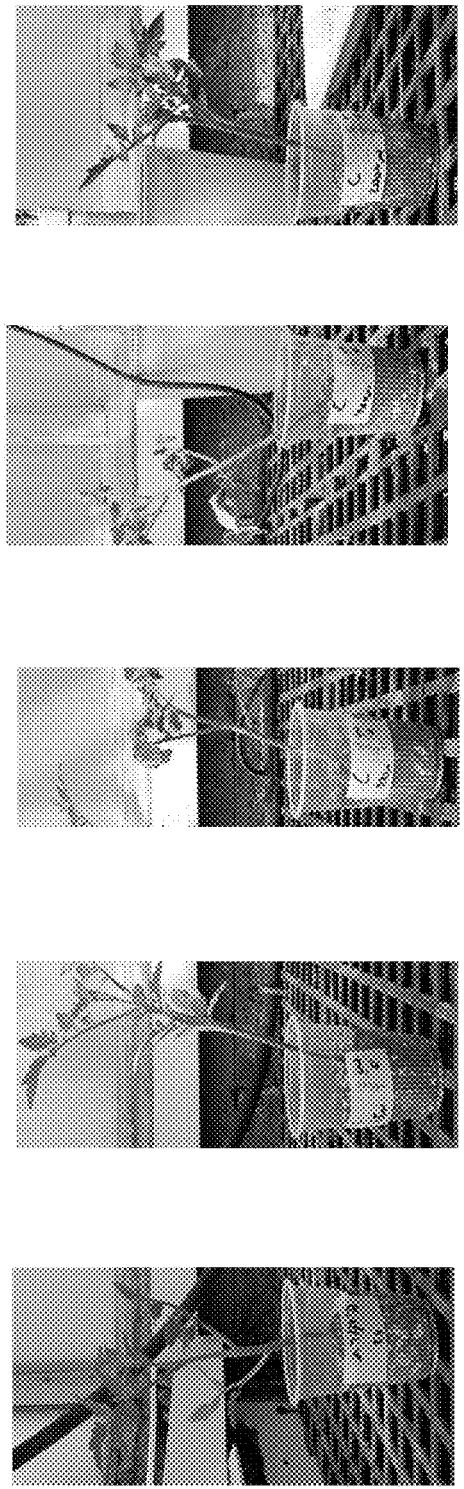
FIGURE 3A FIGURE 3B FIGURE 3C FIGURE 3D FIGURE 3E
FIGURE 4A FIGURE 4B FIGURE 4C FIGURE 4D FIGURE 4E

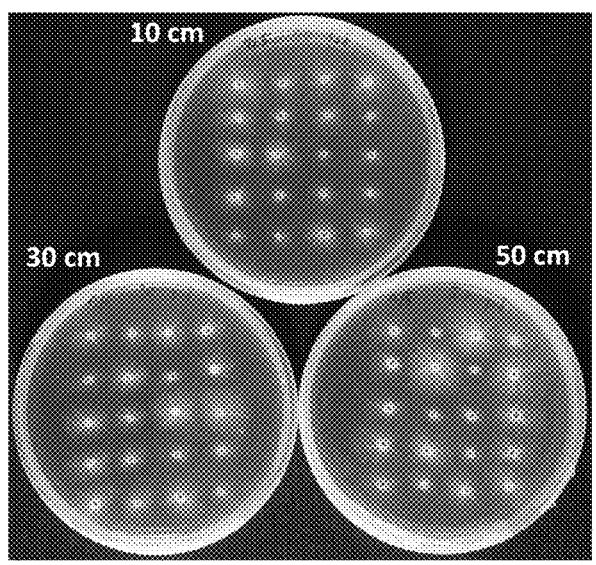
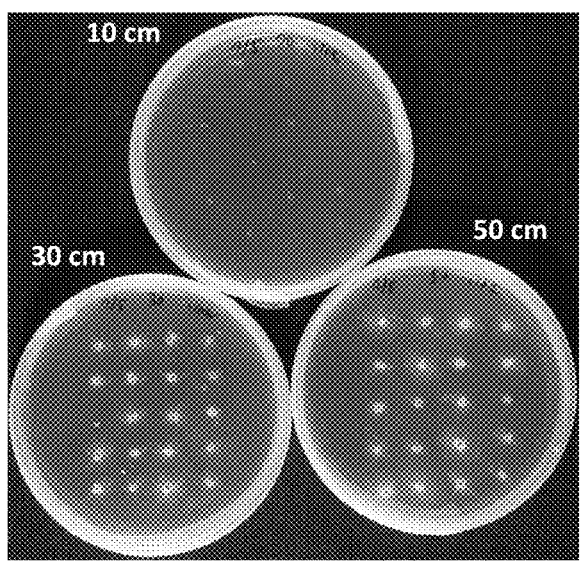
FIGURE 12A  FIGURE 12B
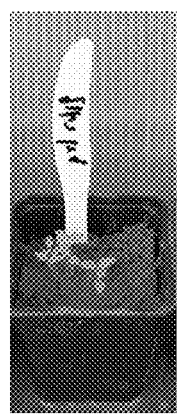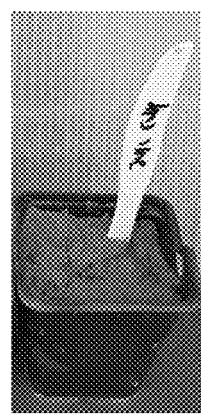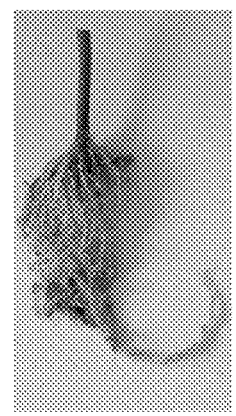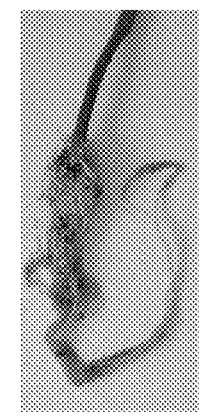
FIGURE 13A  FIGURE 13B    FIGURE 14A  FIGURE 14B
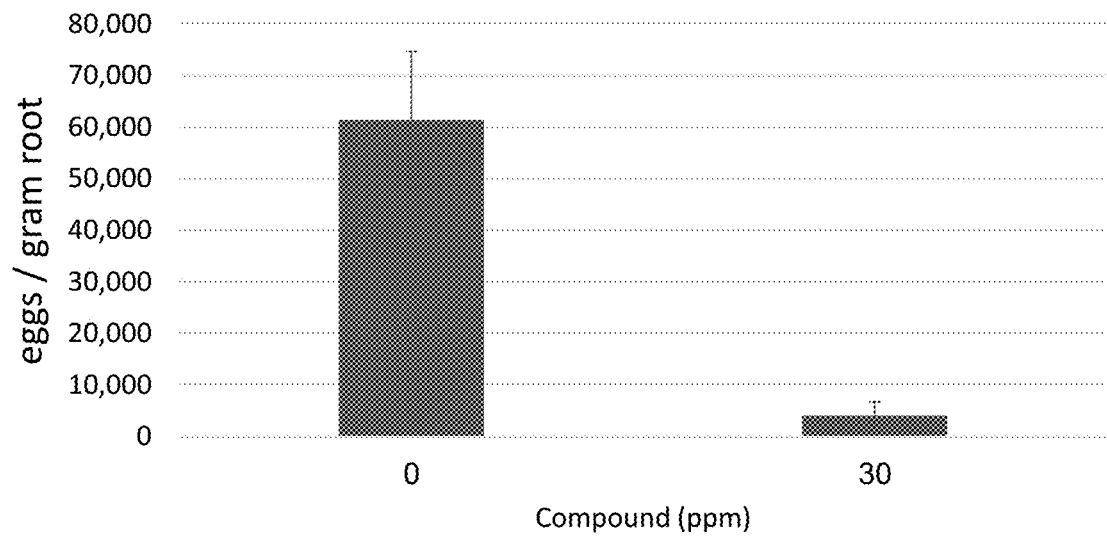
FIGURE 14C

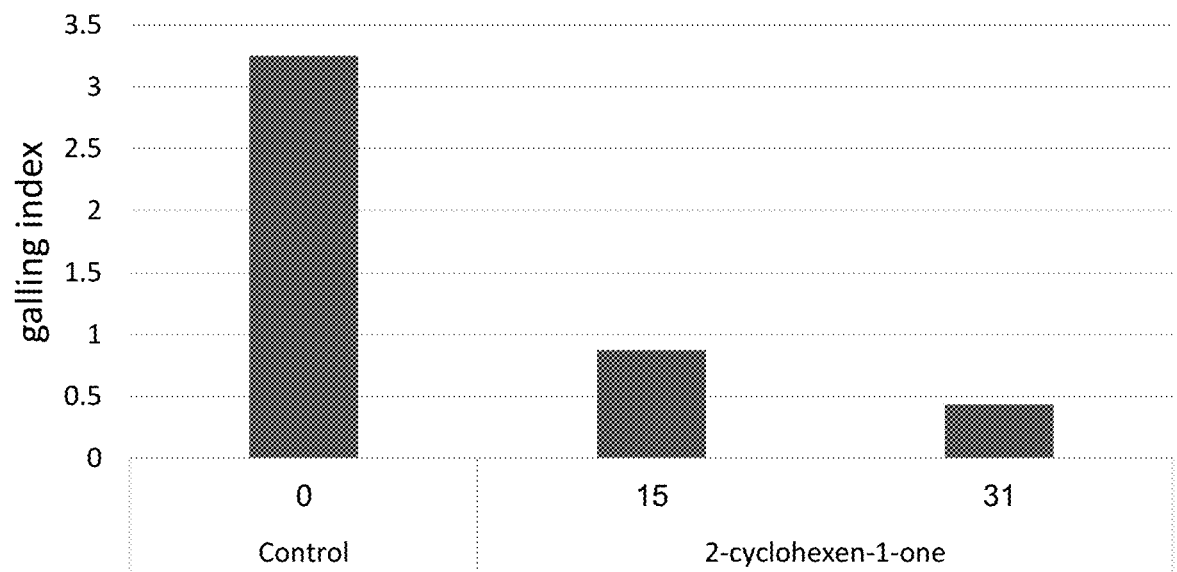
FIGURE 15E
 
FIGURE 16A　　　　FIGURE 16B 0 ppm    54 ppm

PESTICIDES AND METHODS OF CONTROLLING PESTS

CROSS REFERENCE TO RELATED APPLICATIONS

This application is a National Phase of PCT Patent Application No. PCT/IL2018/051235 having International filing date of Nov. 15, 2018, which claims the benefit of priority of U.S. Provisional Patent Application No. 62/586,970 filed Nov. 16, 2017; the contents of the above applications are all incorporated by reference as if fully set forth herein in their entirety.

FIELD OF THE INVENTION

This invention, in some embodiments thereof, relates to the field of pesticides, and more particularly to nematocidal and fungicidal compounds.

BACKGROUND OF THE INVENTION

Pesticides are used for a variety of applications, including crop treatments, animal treatments, treatments for substrates such as wood or other surfaces, and treatment of home infestations. The choice of pesticide typically depends on a variety of factors, including the type of pest, the type of application, the likelihood of contact with humans or other animals, the porosity of the substrate, and etc.

Commercially known pesticides such as herbicides, fungicides, insecticides, bactericides and other active agents and compounds are applied periodically in the home, agriculture, and other places. Farmers, however, still need to spray their crops and animals with these active agents and compounds. To this end, there have been several unsuccessful attempts to provide an efficient use of compounds in a manner that is effective, and economical, as well as environmentally acceptable.

SUMMARY OF THE INVENTION

The present invention, in some embodiments thereof, relates to pesticidal, and specifically nematocidal and fungicidal compounds and compositions. Further, the invention provides methods for preventing and inhibiting nematode and fungi growth.

According to one aspect, there is provided a composition comprising a pesticide effective amount of a compound being represented by the structure of general Formula I:

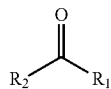

wherein said structure is selected from the group consisting of structures (i) to (iii), wherein:
(i) $R_1$ is hydrogen and $R_2$ is C7 alkyl saturated or non-saturated;
(ii) $R_1$ is hydrogen, methyl or alkoxy and $R_2$ is C3-C9 alkyl; and
(iii) $R_1$ and $R_2$ each represent an alkyl, such that $R_1$ and $R_2$ form together a substituted or unsubstituted, 3-, 4-, 5-, 6- or 7-membered ring; and
wherein the pesticide effective amount is a concentration of 0.5-2500 ppm in said composition.

In some embodiments, the composition further comprises a deodorizing compound. In some embodiments, the deodorizing compound is isoamyl acetate. In some embodiments, the compound and the deodorizing compound are at a ratio of at least 1:1.5 by weight. In some embodiments, the composition comprises 1-50% by weight of the compound. In some embodiments, the composition comprises 40-70% by weight of the deodorizing compound.

In some embodiments, the composition further comprises a glycol ether solvent and one or more surfactants selected from an anionic surfactant, a nonionic surfactant, or a combination thereof.

In some embodiments, the glycol ether solvent comprises an aliphatic diol. In some embodiments, the aliphatic diol is selected from the group consisting of: 4-oxa-2,6-heptandiol, 2-(2-hydroxy-propoxy)-propan-1-ol, and 2-(2-hydroxy-1-methyl-ethoxy)-propan-1-ol. In some embodiments, the composition comprises 5-15% by weight of said glycol ether.

In some embodiments, the anionic surfactant is a linear alkylbenzene sulfonate. In some embodiments, the nonionic surfactant is an ethoxylated castor oil. In some embodiments, the composition comprises 2-10% by weight of said anionic surfactant. In some embodiments, the composition comprises 5-15% by weight of ethoxylated castor oil.

In some embodiments, the composition is for use in killing a pest or reducing growth thereof. In some embodiments, there is provided use of the composition of the present invention for the preparation of a pesticide.

In some embodiments, the compound is represented by Formula IV:

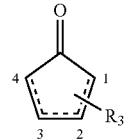

wherein the dashed bond represents at least one double bond between two adjacent carbons at positions 1 to 4, and $R_3$ represents one to four substituents being independently at each occurrence selected from the group consisting of: hydrogen, halo, hydroxy, alkoxy, aryloxy, cycloalkyloxy, heterocyclyloxy, heteroaryloxy, formyl, —S(=O)$R^a$, —S(=O)$_2R^a$, —C(=O)$R^a$, —C(=O)O$R^a$, wherein $R^a$ is independently at each occurrence alkyl, alkenyl, alkynyl, cycloalkyl, aryl, alkylaryl, heterocyclyl or heteroaryl; amino, alkylamino, dialkylamino, arylamino, diarylamino, alkylarylamino, cycloalkylamino, heterocyclylamino, heteroarylamino, amido, alkylamido, dialkylamido, arylamido, diarylamido, alkylarylamido, cycloalkylamido, heterocyclylamido, heteroarylamido, cyano, nitro, carboxyl, carboxyalkyl, carboxyaryl, or acyl.

In some embodiments, the compound is represented by Formula IV (a):

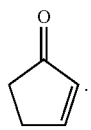

In some embodiments, the compound is represented by Formula V:

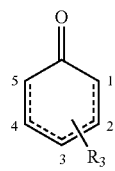

wherein the dashed bond represents at least one double bond between two adjacent carbons at position 1 to 5, and $R_3$ represents one to five substituents being independently at each occurrence selected from the group consisting of: H, halo, heterocyclyl, heteroaryl, hydroxy, alkoxy, aryloxy, cycloalkyloxy, heterocyclyloxy, heteroaryloxy, formyl, —S(=O)$R^a$, —S(=O)2$R^a$, —C(=O)$R^a$, —C(=O)O$R^a$, wherein $R^a$ is independently at each occurrence alkyl, alkenyl, alkynyl, cycloalkyl, aryl, alkylaryl, heterocyclyl or heteroaryl; amino, alkylamino, dialkylamino, arylamino, diarylamino, alkylarylamino, cycloalkylamino, heterocyclylamino, heteroarylamino, amido, alkylamido, dialkylamido, arylamido, diarylamido, alkylarylamido, cycloalkylamido, heterocyclylamido, heteroarylamido, cyano, nitro, carboxyl, carboxyalkyl, carboxyaryl, or acyl.

In some embodiments, the compound is represented by Formula V (a):

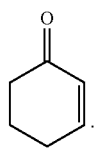

In some embodiments, the compound is in the form of Formula VI:

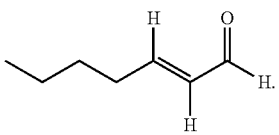

In some embodiments, the compound is selected from the group consisting of: Formula VII (a):

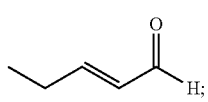

Formula VII (b):

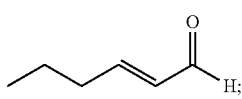

Formula VII (c):

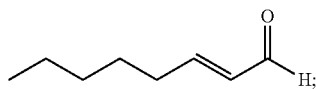

Formula VII (d):

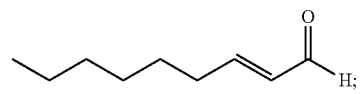

Formula VII (e):

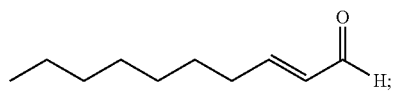

Formula VII (f):

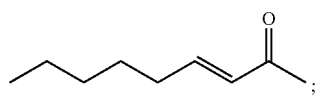

Formula VII (g):

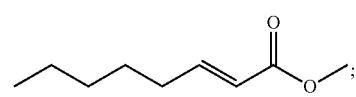

Formula VII (h):

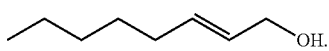

In some embodiments, the pest is a pathogenic parasite. In some embodiments, the pest is selected from the group consisting of: nematodes, fungi, and microorganisms. In some embodiments, the nematode is *Meloidogyne javanica*. In some embodiments, the fungus is selected from the group consisting of: *Aspergillus niger, Botrytis cinerea, Alternaria alternata, Sclerotium rolfsii, Rhizoctonia solani, Fusarium oxysporum* f sp. *Radicis-cucumerinum, Lasiodiplodia theobromas, Neoscytalidium dimidiatum, Talaromyces* spp., *Phoma tracheiphila, Colletotrichum* spp., *Verticillium* spp., *Pythium* spp., *Fusarium oxysporum* f sp. *radicis-lycopersici* (Forl) and *Penicillium digitatum.*

According to another aspect, there is provided a method of killing a pest or reducing growth thereof, comprising exposing the pest to the composition of the invention.

According to another aspect, there is provided an article comprising the composition of the invention deposited on at least one surface thereof.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description together with the drawings makes apparent to those skilled in the art how embodiments of the invention may be practiced.

FIGS. 3A-3E are photographic images demonstrating the phytotoxicity of trans-2-octenal after one day from treatment with various concentrations: 0 ppm or control (FIG. 3A), 250 ppm (3B), 1,000 ppm (3C), 4,000 ppm (3D), and 20,000 ppm (3E).

FIGS. 4A-4E are photographic images demonstrating the phytotoxicity of 2-cyclopenten-1-one after one day from treatment with various concentrations (from left to right): 0 ppm or control (4A), 250 ppm (4B), 1,000 ppm (4C), 4,000 ppm (4D), and 20,000 ppm (4E).

FIGS. 12A-12B are photographic images of culture plates showing the effect of trans-2-octenal on sclerotia of *S. rolfsii* in sandy soil. Soil samples from different depths were cultured on PDA+tet culture plates and grown for 2 days at 25° C. (12A) is control, and (12B) demonstrates the application of 54 ppm of trans-2-octenal. The numbers on the figure represent the depth (in cm) of sampling.

FIGS. 13A-13B are photographic images showing the effect of trans-2-octenal on the viability of *Solanum nigrum* seeds in sandy soil. Seeds were buried in soil at the depth of 10 cm in the absence (13A) or presence (13B) of trans-2-octenal at concentration of 54 ppm for 6 days before evaluation of their viability.

FIGS. 14A-14D are photographic images and vertical bar graphs showing the nematocidal activity of trans-2-octenal against *M. javanica* in greenhouse experiments using susceptible tomato plants. Pots were filled with 800 g of loam inoculated with 3,770 J2 *M. javanica* larvae. Two days later, 30 ppm of trans-2-octenal was applied to the soil and the pots were sealed for additional 5 days. Then, the pots were opened, and susceptible tomato plants were planted. Eight weeks later the plants were harvested, the roots were cleaned, and galling index was evaluated. In addition, eggs were extracted from each root and the number of eggs per gram root was calculated. (14A) is a photograph showing a root from control plant and (14B) is a photograph showing a root from a plant that was treated with 30 ppm of trans-2-octenal. (14C) is a vertical bar graph showing the effect of the compound on the number of eggs per gram root, and (14D) is a vertical bar graph showing the effect of the compound on galling index.

FIGS. 15A-15E are photographic images and vertical bar graphs showing the nematocidal activity of 2-cyclohexen-1-one against *M. javanica* in greenhouse experiments using susceptible tomato plants. Pots were filled with 800 g of loam inoculated with 3,900 J2 *M. javanica* larvae. Two days later, 15 or 30 ppm of 2-cyclohexen-1-one were applied to the soil and the pots were sealed for additional 5 days. Then, the pots were opened, and susceptible tomato plants were planted. Eight weeks later the plants were harvested, the roots were cleaned and galling index was evaluated. In addition, eggs were extracted from each root and the number of eggs per gram root was calculated. (15A) is a photograph showing a root from control plant, (15B and 15C) are photographs showing roots from plants that were treated with 15 ppm and 30 ppm of 2-cyclohexen-1-one, respectively. (15D) is a vertical bar graph showing the effect of the compound on the number of eggs per gram root, and (15E) is a vertical bar graph showing the effect of the compound on galling index.

FIGS. 16A-16E are representative photographic images and a vertical bar graph showing the results of a phytotoxicity test of trans-2-octenal. Seeds of corn (16A), cotton (16B) and peanut (16C), and seedling of tomato (16E) were grown in sandy soil treated or untreated with 54 ppm of trans-2-octenal. Nine (9) days later, the number of germinated seeds was counted, and the growth of the tomato seedling was monitored. (16D) is a vertical bar graph summarizing the number of germinates seeds in treated and untreated soil.

FIGS. 17A-17E are vertical bar graphs and photographic images showing the results of a phytotoxicity test of trans-2-octenal in the field. Seedling of lettuce (17A), tomato strain Abigail (17B), and tomato strain Ikram (17C) were planted one day after application of trans-2-octenal. The viability of the seedlings was estimated 11 days post planting. (17D and 17E) are representative photographic images of seedlings which were grown in the absence (17D) or presence (17E) of trans-2-octenal at concentration of 400 ppm.

DETAILED DESCRIPTION OF THE INVENTION

Figure 1A:
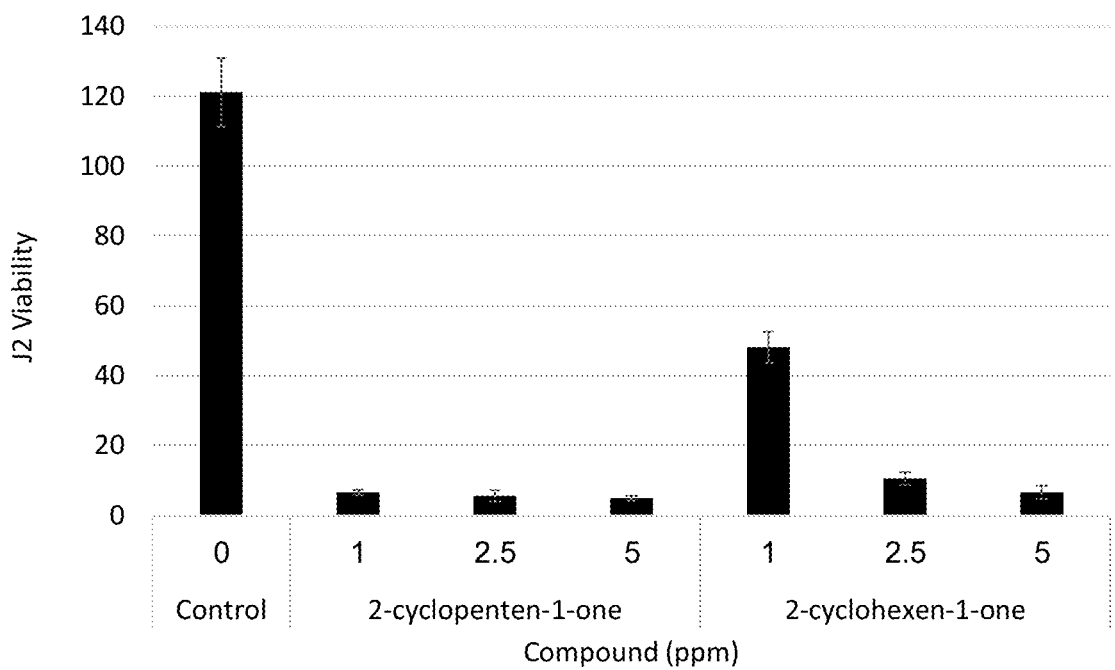
FIGS. 1A-1C are vertical bar graphs showing viability level (after 2 days vis-à-vis a control bar) of J2 nematodes treated by different concentrations of various compounds of incubation.

The present invention, in some embodiments thereof, relates to agricultural biocontrol compositions and methods of using the same.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

The Compounds

According to an aspect of some embodiments of the present invention, there is provided herein a compound for inhibiting or killing a pathogen having the general Formula I:

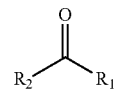

wherein $R_1$ and $R_2$ represents substituents, wherein $R_1$ is selected from hydrogen, methyl, alkoxy, and wherein, $R_2$ is selected from alkene, saturated or non-saturated alkyl.

In some embodiments, $R_2$ is a C3 alkyl that forms together with $R_1$ a 5-membered ring. In some embodiments, $R_2$ is a C4 alkyl that forms together with $R_1$ a 6-membered ring. In some embodiments, $R_2$ is a C5 alkyl that forms together with $R_1$ a 7-membered ring. In some embodiments, $R_2$ is a C3 alkyl. In some embodiments, $R_2$ is a C4 alkyl. In some embodiments, $R_2$ is a C5 alkyl. In some embodiments, $R_2$ is a C6 alkyl. In some embodiments, $R_2$ is a C7 alkyl. In some embodiments, $R_2$ is a C8 alkyl. In some embodiments, $R_2$ is a C9 alkyl.

In some embodiments, $R_1$ is selected from hydrogen, methyl or alkoxy and $R_2$ is a C3-C9 alkyl, wherein the compound is at an effective concentration of 0.5-2500 ppm (e.g., within a formulation or a composition comprising the same).

In some embodiments, the effective concentration is 0.5 ppm, 1 ppm, 500 ppm, 1000 ppm, 1500 ppm, 2000 ppm, or 2500 ppm, including any value and range therebetween.

In some embodiments, $R_1$ and $R_2$ each represents an alkyl, such that $R_1$ and $R_2$ form together a substituted or unsubstituted, 3-, 4-, 5-, 6-, or 7-membered ring.

In some embodiments, $R_2$ comprises at least one double bond, as represented by the structure of:

wherein the dashed bond represents at least one double bond between two adjacent carbon atoms at positions 1-2, 2-3, 3-4, 4-5, 5-6, 6-7, 7-8 and 8-9.

In some embodiments, the compound is in the form of the general Formula II:

wherein $R_3$ represents one, or two substituents, or is absent. Embodiments of $R_3$ are described hereinbelow.

In some embodiments, the compound is in the form of the general Formula III:

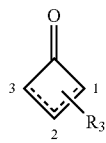

wherein the dashed bond represents at least one double bond between two adjacent carbons at positions 1 to 3, and $R_3$ represents one, two, or three substituents, or is absent. Embodiments of R3 are described hereinbelow.

In some embodiments, the compound is in the form of the general Formula IV:

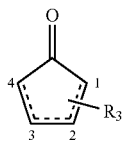

wherein the dashed bond represents at least one double bond between two adjacent carbons at positions 1 to 4, and $R_3$ represents one to four substituents, or is absent.

In some embodiments, the compound is in the form of the general Formula V:

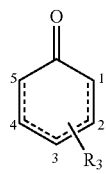

wherein the dashed bond represents at least one double bond between two adjacent carbons at position 1 to 5, and $R_3$ represents one to five substituents, or is absent.

In some embodiments, $R_3$ is absent. In some embodiments, $R_3$ represents one substituent. In some embodiments, $R_3$ represents, independently, two substituents. In some embodiments, $R_3$ represents independently, three substituents. In some embodiments, $R_3$ represents independently, four substituents. In some embodiments, $R_3$ represents independently, five substituents. In some embodiments, $R_3$ comprises halo. In some embodiments, $R_3$ is heterocyclyl. In some embodiments, $R_3$ is heteroaryl. In some embodiments, $R_3$ is hydroxy. In some embodiments, $R_3$ is alkoxy. In some embodiments, $R_3$ is aryloxy. In some embodiments, $R_3$ is cycloalkyloxy. In some embodiments, $R_3$ is heterocyclyloxy. In some embodiments, $R_3$ is heteroaryloxy. In some embodiments, $R_3$ is formyl. In some embodiments, $R_3$ comprises —S(=O)$R^a$. In some embodiments, $R_3$ comprises —S(=O)$_2R^a$. In some embodiments, $R_3$ comprises —C(=O)$R^a$. In some embodiments, $R_3$ comprises —C(=O)O$R^a$. In some embodiments, $R^a$ is alkyl. In some embodiments, $R^a$ is alkenyl. In some embodiments, $R^a$ is alkynyl. In some embodiments, $R^a$ is cycloalkyl. In some embodiments, $R^a$ is aryl. In some embodiments, $R^a$ is alkylaryl. In some embodiments, $R^a$ is heterocyclyl. In some embodiments, $R^a$ is heteroaryl. In some embodiments, $R^a$ is amino. In some embodiments, $R^a$ is alkylamino. In some embodiments, $R^a$ is dialkylamino. In some embodiments, $R^a$ is arylamino. In some embodiments, $R^a$ is diarylamino. In some embodiments, $R^a$ is alkylarylamino. In some embodiments, $R^a$ is cycloalkylamino. In some embodiments, $R^a$ is heterocyclylamino. In some embodiments, $R^a$ is heteroarylamino. In some embodiments, $R^a$ is amido. In some embodiments, $R^a$ is alkylamido. In some embodiments, $R^a$ is dialkylamido. In some embodiments, $R^a$ is arylamido. In some embodiments, $R^a$ is diarylamido. In some embodiments, $R^a$ is alkylarylamido. In some embodiments, $R^a$ is cycloalkylamido. In some embodiments, $R^a$ is heterocyclylamido. In some embodiments, $R^a$ is heteroarylamido. In some embodiments, $R^a$ is cyano. In some embodiments, $R^a$ is nitro. In some embodiments, $R^a$ is carboxyl. In some embodiments, $R^a$ is carboxyalkyl. In some embodiments, $R^a$ is carboxyaryl. In some embodiments, $R^a$ is acyl.

In some embodiments, the disclosed compound is in the form of Formula II (a):

In some embodiments, the disclosed compound is in the form of Formula III (a):

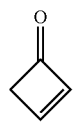

In some embodiments, the disclosed compound is in the form of Formula IV (a):

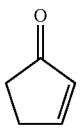

In some embodiments, the disclosed compound is in the form of Formula V (a):

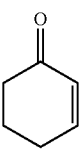

In some embodiments, the disclosed compound is in the form of Formula VI:

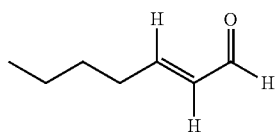

In some embodiments, the disclosed compound is in the form of Formula VII:

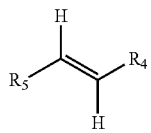

wherein $R_5$ and $R_4$ represent, independently, and in each occurrence, a substituent.

In some embodiments, $R_5$ is C2 alkyl. In some embodiments, $R_5$ is C3 alkyl. In some embodiments, $R_5$ is C4 alkyl. In some embodiments, $R_5$ is C5 alkyl. In some embodiments, $R_5$ is C6 alkyl. In some embodiments, $R_5$ is C7 alkyl. In some embodiments, $R_4$ is or comprises carboxy. In some embodiments, $R_4$ is or comprises carbonyl. In some embodiments, $R_4$ is or comprises alkoxy. In some embodiments, $R_4$ is or comprises hydroxy. In some embodiments, $R_5$ comprises at least one double bond, as represented by the structure of:

wherein the dashed bond represents at least one double bond between two adjacent carbon atoms at positions 1-2, 2-3, 3-4, 4-5, 5-6, 6-7, 7-8, or 8-9.

In some embodiments, the disclosed compound is in the form of Formula VII (a):

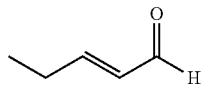

In some embodiments, the disclosed compound is in the form of Formula VII (b):

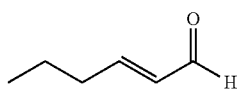

In some embodiments, the disclosed compound is in the form of Formula VII (c):

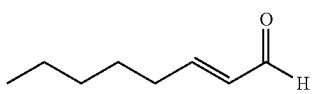

In some embodiments, the disclosed compound is in the form of Formula VII (d):

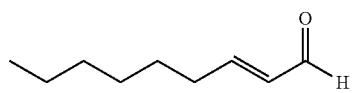

In some embodiments, the disclosed compound is in the form of Formula VII (e):

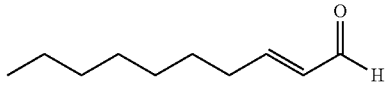

In some embodiments, the disclosed compound is in the form of Formula VII (f):

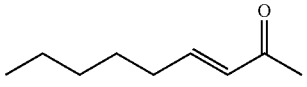

In some embodiments, the disclosed compound is in the form of Formula VII (g):

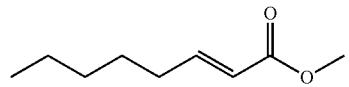

In some embodiments, the disclosed compound is in the form of Formula VII (h):

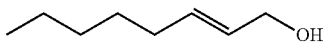

In some embodiments, the pesticide effective amount (in parts per million; ppm) (e.g., for inhibiting or killing a pathogen) is in the range of 0.1-50, 0.1-200, 0.1-300, 0.1-400, 0.1-500, 0.1-600, 0.1-700, 0.1-800, 0.1-1000, 0.1-1500, 0.1-2000, 0.1-2500, 0.1-3000, 0.1-5000, 0.2-50, 0.2-200, 0.2-300, 0.2-400, 0.2-500, 0.2-600, 0.2-700, 0.2-800, 0.2-1000, 0.2-1500, 0.2-2000, 0.2-2500, 0.2-3000, 0.2-5000, 0.5-50, 0.5-200, 0.5-300, 0.5-400, 0.5-500, 0.5-600, 0.5-700, 0.5-800, 0.5-1000, 0.5-1500, 0.5-2000, 0.5-2500, 0.5-3000, 0.5-5000, 1-50, 1-200, 1-300, 1-400, 1-500, 1-600, 1-700, 1-800, 1-1000, 1-1500, 1-2000, 1-2500, 1-3000, 1-5000, 2-50, 2-200, 2-300, 2-400, 2-500, 2-600, 2-700, 2-800, 2-1000, 2-1500, 2-2000, 2-2500, 2-3000, 2-5000, 5-50, 5-200, 5-300, 5-400, 5-500, 5-600, 5-700, 5-800, 5-1000, 5-1500, 5-2000, 5-2500, 5-3000, 5-5000, 25-50, 25-200, 25-300, 25-400, 25-500, 25-600, 25-700, 25-800, 25-1000, 25-1500, 25-2000, 25-2500, 25-3000, 25-5000, 50-200, 50-300, 50-400, 50-500, 50-600, 50-700, 50-800, 50-1000, 50-1500, 50-2000, 50-2500, 50-3000, or 50-5000 ppm. Each possibility represents a separate embodiment of the invention. In some embodiments, the effective concentration for inhibiting or killing a pathogen is 0.2-1000 ppm. In some embodiments, the effective concentration for inhibiting or killing a pathogen is 1-2500 ppm.

In some embodiments, the compound represented by the structure of general Formula I is at an effective concentration of e.g., 0.2-2500 ppm. In some embodiments, the compound represented by the structure of general Formula II is at an effective concentration of e.g., 0.2-1000 ppm. In some embodiments, the compound represented by the structure of general Formula II (a) is at an effective concentration of e.g., 0.2-1000 ppm. In some embodiments, the compound represented by the structure of general Formula III is at an effective concentration of e.g., 0.2-1000 ppm. In some embodiments, the compound represented by the structure of general Formula III (a) is at an effective concentration of e.g., 0.2-1000 ppm. In some embodiments, the compound represented by the structure of general Formula IV is at an effective concentration of e.g., 0.2-1000 ppm. In some embodiments, the compound represented by the structure of general Formula IV (a) is at an effective concentration of e.g., 0.2-1000 ppm. In some embodiments, the compound represented by the structure of general Formula V is at an effective concentration of e.g., 0.2-1000 ppm. In some embodiments, the compound represented by the structure of general Formula V (a) is at an effective concentration of e.g., 0.2-1000 ppm. In some embodiments, the compound represented by the structure of general Formula VI is at an effective concentration of e.g., 0.5-2500 ppm. In some embodiments, the compound represented by the structure of general Formula VII is at an effective concentration of e.g., 0.5-2500 ppm. In some embodiments, the compound represented by the structure of general Formula VII (a) is at an effective concentration of e.g., 0.5-2500 ppm. In some embodiments, the compound represented by the structure of general Formula VII (b) is at an effective concentration of e.g., 0.5-2500 ppm. In some embodiments, the compound represented by the structure of general Formula VII (c) is at an effective concentration of e.g., 0.5-2500 ppm. In some embodiments, the compound represented by the structure of general Formula VII (d) is at an effective concentration of e.g., 0.5-2500 ppm. In some embodiments, the compound represented by the structure of general Formula VII (e) is at an effective concentration of e.g., 0.5-2500 ppm. In some embodiments, the compound represented by the structure of general Formula VII (f) is at an effective concentration of e.g., 0.5-2500 ppm. In some embodiments, the compound represented by the structure of general Formula VII (g) is at an effective concentration of e.g., 0.5-2500 ppm. In some embodiments, the compound represented by the structure of general Formula VII (h) is at an effective concentration of e.g., 0.5-2500 ppm.

In some embodiments, the pathogen is a parasite selected from, but not limited to: nematodes, wireworms, fungi, weeds, insects, microorganisms and aphids.

In some embodiments, the pathogen is a nematode selected from, but not limited to: parasitic nematodes such as root-knot, reniform, cyst, and lesion nematodes, including but not limited to *Aphelenchoides* spp., *Belonolaimus* spp., *Bursaphelenchus* spp., *Criconema* spp. *Globodera* spp., *Meloidogyne* spp., *Tylenchorhynchus* spp., *Helicotylenchus* spp., *Heterodera* spp., *Hoplolaimus* spp., *Pratylenchus* spp., *Rotylenchulus* spp., *Trichodorus* spp., and *Xiphinema* spp. In particular, the parasitic nematodes may include but are not limited to seed gall nematodes (*Afrina wevelli*), bentgrass nematodes (*Anguina agrostis*), shoot gall nematodes (*Anguina* spp.), seed gall nematodes (*Anguina* spp., *A. amsinckiae, A. balsamophila; A. tritici*), fescue leaf gall nematodes (*A. graminis*), ear-cockle (or wheat gall) nematodes (*Anguina tritici*), bud and leaf (or foliar) nematodes (*Aphelenchoides* spp., *A. subtenuis*), begonia leaf (or fern, or spring crimp, or strawberry foliar, or strawberry nematodes, or summer dwarf) nematodes (*A. fragariae*), fern nematodes (*A. olesistus*), rice nematodes (*A. oryzae*), currant nematodes (*A. ribes*), black currant (or chrysanthemum) nematodes (*A. ritzemabosi*), chrysanthemum foliar or leaf nematodes (*A. ritzemabosi*), rice white-tip (or spring dwarf, or strawberry bud) nematodes (*A. besseyi*), fungus-feeding (mushroom) nematodes (*Aphelenchoides composticola*), *Atalodera* spp. (*Atalodera lonicerae, Atalodera ucri*), spine nematodes (*Bakernema variabile*), sting nematodes (*Belonolaimus* spp., *B. gracilis, B. longicaudatus*), pine wood nematodes (*Bursaphalenchus* spp., *B. xylophilus, B. mucronatus*), sessile nematodes (*Cacopaurus* spp., *C. epacris, C. pestis*), amaranth cyst nematodes (*Cactodera amaranthi*), birch cyst nematodes (*C. betulae*), cactus cyst nematodes (*C. cacti*), estonian cyst nematodes (*C. estonica*), Thorne's cyst nematodes (*C. thornei*), knotweed cyst nematodes (*C. weissi*), ring nematodes (*Criconema* spp.), spine nematodes (*Criconema* spp., *C. civellae, C. decalineatum, C. spinalineatum*), ring nematodes (*Criconemella axeste, C. curvata, C. macrodora, C. parva*), ring nematodes (*Criconemoides* spp., *C. citri, C. simile*), spine nematodes (*Crossonema fimbriatum*), eucalypt cystoid nematodes (*Cryphodera eucalypti*), bud, stem and bulb nematodes (*Ditylenchus* spp., *D. angustus, D. dipsaci, D. destructor, D. intermedius*), Mushroom spawn nematodes (*D. myceliophagus*), awl nematodes (*Dolichodorus* spp., *D. heterocephalus, D. heterocephalous*), spear nematodes (*Dorylaimus* spp.), stunt nematodes (*Geocenamus superbus*), cyst nematodes (*Globodera* spp.), yarrow cyst nematodes (*G. achilleae*), milfoil cyst nematodes (*G. millefolii*), apple cyst nematodes (*G. mali*), white cyst potato nematodes (*G. pallida*), golden nematodes (*G. rostochiensis*), tobacco cyst nematodes (*G. tabacum*), Osborne's cyst nematodes (*G. tabacum solanacearum*), horsenettle cyst nematodes (*G. tabacum virginiae*), pin nematodes (*Gracilacus* spp., *G. idalimus*), spiral nematodes (*Helicotylenchus* spp., *H. africanus, H. digonicus, H. dihystera, H. erythrinae, H. multicinctus, H. paragirus, H. pseudorobustus, H. solani, H. spicaudatus*), sheathoid nematodes (*Hemicriconemoides* spp., *H. biformis, H. californianus, H. chitwoodi, H. floridensis, H. wessoni*), sheath nematodes (*Hemicycliophora* spp., *H. arenaria, H. biosphaera, H. megalodiscus, H. parvana, H. poranga, H. sheri, H. similis, H. striatula*), cyst nematodes (*Heterodera* spp.), almond cyst nematodes (*H. amygdali*), oat (or cereal) cyst nematodes (*H. avenae*), Cajanus (or pigeon pea) cyst nematodes (*H. cajani*), Bermuda grass (or heart-shaped, or Valentine) cyst nematodes (*H. cardiolata*), carrot cyst nematodes (*H. carotae*), cabbage cyst nematodes or *brassica* root eelworm (*H. cruciferae*), nutgrass (or sedge) cyst nematodes (*H. cyperi*), Japanese cyst nematodes (*H. elachista*), fig (or *ficus*, or rubber) cyst nematodes (*H. fici*), galeopsis cyst nematodes (*H. galeopsidis*), soybean cyst nematodes (*H. glycines*), alfalfa root (or pea cyst) nematodes (*H. goettingiana*), buckwheat cyst nematodes (*H. graduni*), barley cyst nematodes (*H. hordecalis*), hop cyst nematodes (*H. humuli*), Mediterranean cereal (or wheat) cyst nematodes (*H. latipons*), lespedeza cyst nematodes (*H. lespedezae*), Kansas cyst nematodes (*H. longicolla*), cereals root eelworm or oat cyst nematodes (*H. major*), grass cyst nematodes (*H. mani*), lucerne cyst nematodes (*H. medicaginis*), cyperus (or motha) cyst nematodes (*Heterodera mothi*), rice cyst nematodes (*H. oryzae*), Amu-Darya (or camel thorn cyst) nematodes (*H. oxiana*), dock cyst nematodes (*H. rosii*), *rumex* cyst nemtodes (*H. rumicis*), sugar beet cyst nematodes (*H. schachtii*), willow cyst nematodes (*H. salixophila*), knawel cyst nematodes (*H. scleranthii*), sowthistle cyst nematodes (*H. sonchophila*), tadzhik cyst nematodes (*H. tadshikistanica*), turkmen cyst nematodes (*H. turcomanica*), clover cyst nematodes (*H. trifolii*), nettle cyst nematodes (*H. urticae*), ustinov cyst nematodes (*H. ustinovi*), cowpea cyst nematodes (*H. vigni*), corn cyst nematodes (*H. zeae*), rice root nematodes (*Hirschmanniella* spp., *H. belli, H. caudacrena, H. gracilis, H. oryzae*), lance nematodes (*Hoplolaimus* spp.), Columbia nematodes (*H. columbus*), Cobb's lance nematodes (*H. galeatus*), crown-headed lance nematodes (*H. tylenchiformis*), pseudo root-knot nematodes (*Hy-* psoperine graminis), needle nematodes (*Longidorus* spp., *L. africanus, L. sylphus*), ring nematodes (*Macroposthonia* (=*Mesocriconema*) *xenoplax*), cystoid nematodes (*Meloidodera* spp.), pine cystoid nematodes (*M. floridensis*), tadzhik cystoid nematodes (*M. tadshikistanica*), stunt body nematodes (*Meloidoderita* spp.), stunt nematodes (*Merlinius* spp., *M. brevidens, M. conicus, M. grandis, M. microdorus*), root-knot nematodes (*Meloidogyne* spp., *M. acronea, M. arenaria, M. artiellia, M. brevicauda, M. camelliae, M. carolinensis, M. chitwoodi, M. exigua, M. graminicola, M. hapla, M. hispanica, M. incognita, M. incognita acrita, M. indica, M. inornata, M. javanica, M. kikuyuensis, M. konaensis, M. mali, M. microtyla, M. naasi, M. ovalis, M. platani, M. querciana, M. sasseri, M. tadshikistanica, M. thamesi*), knapweed nematodes (*Mesoanguina picridis*), Douglas fir nematodes (*Nacobbodera chitwoodi*), false root-knot nematodes (*Nacobbus aberrans, N. batatiformis, N. dorsalis*), sour paste nematodes (*Panagrellus redivivus*), beer nematodes (*P. silusiae*), needle nematodes (*Paralongidorus microlaimus*), spiral nematodes (*Pararotylenchus* spp.), stubby-root nematodes (*Paratrichodorus allius, P. minor, P. porosus, P. renifer*), pin nematodes (*Paratylenchus* spp., *P. baldaccii, P. bukowinensis, P. curvitatus, P. dianthus, P. elachistus, P. hamatus, P. holdemani, P. italiensis, P. lepidus, P. nanus, P. neoamplycephalus, P. similis*), lesion (or meadow) nematodes (*Pratylenchus* spp., *P. alleni, P. brachyurus, P. coffeae, P. convallariae, P. crenatus, P. flakkensis, P. goodeyi, P. hexincisus, P. leiocephalus, P. minyus, P. musicola, P. neglectus, P. penetrans, P. pratensis, P. scribneri, P. thornei, P. vulnus, P. zeae*), stem gall nematodes (*Pterotylenchus cecidogenus*), grass cyst nematodes (*Punctodera punctate*), stunt nematodes (*Quinisulcius acutus, Q. capitatus*), burrowing nematodes (*Radopholus* spp.), banana-root nematodes (*R. similis*), rice-root nematodes (*R. oryzae*), red ring (or coconut, or cocopalm) nematodes (*Rhadinaphelenchus cocophilus*), reniform nematodes (*Rotylenchulus* spp., *R. reniformis, R. parvus*), spiral nematodes (*Rotylenchus* spp., *R. buxophilus, R. christiei, R. robustus*), Thorne's lance nematodes (*R. uniformis*), Sarisodera hydrophylla, spiral nematodes (*Scutellonema* spp., *S. blaberum, S. brachyurum, S. bradys, S. clathricaudatum, S. christiei, S. conicephalum*), grass root-gall nematodes (*Subanguina radicicola*), round cystoid nematodes (*Thecavermiculatus andinus*), stubby-root nematodes (*Trichodorus* spp., *T. christiei, T. kurumeensis, T. pachydermis, T. primitivus*), vinegar eels (or nematodes) (*Turbatrix aceti*), stunt (or stylet) nematodes (*Tylenchorhynchus* spp., *T. agri, T. annulatus, T. aspericutis, T. claytoni, T. ebriensis, T. elegans, T. golden, T. graciliformis, T. martini, T. mashhoodi, T. microconus, T. nudus, T. oleraceae, T. penniseti, T. punensis*), citrus nematodes (*Tylenchulus semipenetrans*), dagger nematodes (*Xiphinema* spp., *X. americanum, X. bakeri, X. brasiliense, X. brevicolle, X. chambersi, X. coxi, X. diversicaudatum X. index, X. insigne, X. nigeriense, X. radicicola, X. setariae, X. vulgarae, X. vuittenezi*). In a particular embodiment nematodes controlled are member of the *Meloidogyne* spp, particularly, *M. hapla* or *M. incognita*.

In some embodiments, the pathogen is a fungus selected from, but not limited to: mold, *Alternaria* spp. (e.g., *Alternaria alternata, Alternaria solani*); *Aphanomyces* spp. (e.g., *Aphanomyces euteiches*); *Aspergillus* spp. (e.g., *Aspergillus niger, Aspergillus fumigatus*); *Athelia* spp. (e.g., *Athelia rolfsii*); *Aureobasidium* spp. (e.g., *Aureobasidium pullulans*); *Bipolaris* spp. (e.g. *Bipolaris zeicola, Bipolaris maydis*); *Botrytis* spp. (e.g., *Botrytis cinerea*); *Calonectria* spp. (e.g., *Calonectria kyotensis*); *Cephalosporium* spp. (e.g., *Cephalosporium maydis*); *Cercospora* spp. (e.g., *Cercospora medicaginis, Cercospora sojina, Colletotrichum coccodes, Colletotrichum fragariae, Colletotrichum graminicola*); *Coniella* spp. (e.g., *Coniella diplodiella*); *Colletotrichum* spp.; *Coprinopsis* spp. (e.g., *Coprinopsis psychromorbida*); *Corynespora* spp. (e.g., *Corynespora cassiicola; Curvularia* spp. (e.g., *Curvularia pallescens*); *Cylindrocladium* spp. (e.g., *Cylindrocladium crotalariae*); *Diplocarpon* spp. (e.g., *Diplocarpon earlianum*); *Diplodia* spp. (e.g., *Diplodia gossyina*); *Epicoccum* spp. (e.g., *Epicoccum nigrum*); *Erysiphe* spp. (*Erysiphe cichoracearum*); *Fusarium* spp. (e.g., *Fusarium graminearum, Fusarium oxysporum* f sp. *fragariae, Fusarium oxysporum* f. sp. *tuberosi, Fusarium proliferatum* var. *proliferatum, Fusarium solani, Fusarium verticillioides, Fusarium clumorum, Fusarium euwallaceae*); *Ganoderma* spp. (e.g., *Ganoderma boninense*); *Geotrichum* spp. (e.g., *Geotrichum candidum*); *Glomerella* spp. (e.g., *Glomerella tucumanensis*); *Guignardia* spp. (e.g., *Guignardia bidwellii*); *Kabatiella* spp. (e.g., *Kabatiella zeae*); *Leptosphaerulina* spp. (e.g., *Leptosphaerulina briosiana*); *Leptotrochila* spp. (e.g., *Leptotrochila rnedicaginis*); *Macrophomina* spp. (e.g., *Macrophomina phaseolina*); *Magnaporthe* spp. (e.g., *Magnaporthe grisea, Magnaporthe oryzae*); *Microsphaera* spp. (e.g., *Microsphaera manshurica*); *Monilinia* spp. (e.g., *Monilinia fructicola*); *Mucor* spp.; *Mycosphaerella* spp. (e.g., *Mycosphaerella juiensis, Mycosphaerella fragariae*); *Nigrospora* spp. (e.g., *Nigrospora oryzae*); *Ophiostoma* spp. (e.g., *Ophiostoma ulmi*); *Penicillium* spp. (e.g., *Penicillium digitatum*); *Peronospora* spp. (e.g., *Peronospora manshurica*); *Phakopsora* (e.g., *Phakopsora pachyrhizi*); *Phoma* spp. (e.g., *Phoma foveata, Phoma medicaginis, Phoma tracheiphila*); *Phomopsis* spp (e.g. *Phomopsis longicolla*); *Phytophthora* spp. (e.g., *Phytophthora cinnamomi, Phytophthora erythroseptica, Phytophthora fragariae, Phytophthora infestans, Phytophthora medicaginis, Phytophthora megasperma, Phytophthora palmivora*); *Podosphaera* (e.g., *Podosphaera leucotricha*); *Pseudopeziza* spp. (e.g., *Pseudopeziza medicaginis*); *Puccinia* spp. (e.g., *Puccinia graminis* subsp. *tritici* (UG99), *Puccinia striiformis, Puccinia recodita, Puccinia sorghi*); *Pyricularia* spp. (*Pyricularia grisea, Pyricularia oryzae*); *Pythium* spp. (e.g., *Pythium ultimum, Pythium aphanidermatum*); *Rhizoctonia* spp. (e.g., *Rhizoctonia solani, Rhizoctonia zeae*); *Rosellinia* spp., *Sclerotinia* spp. (e.g., *Sclerotinia minor; Sclerotinia sclerotiorum, Sclerotinina trifoliorum*); *Sclerotium* spp. (e.g., *Sclerotium rolfsii*); *Septoria* spp. (e.g., *Septoria glycines, Septoria lycoperski*); *Setomelanomma* spp. (e.g., *Setomelanomma turcica*); *Sphaerotheca* spp. (e.g., *Sphaerotheca macularis*); *Spongospora* spp. (e.g., *Spongospora subterranean*); *Stemphylium* spp., *Synchytrium* spp. (e.g., *Synchytrium endobioticum*), *Verticillium* spp. (e.g., *Verticillium albo-atrum, Verticillium dahliae*). In a particular embodiment, the fungus is a member of the *Botrytis* spp. (e.g., *Botrytis cinerea*), *Sclerotinia* spp. (*Sclerotinia minor*), *Sclerotium* spp. (e.g., *Sclerotium rolfsii*), *Macrophomina* spp. (e.g., *Macrophomina phaseolina*), *Verticillium* spp. (e.g., *Verticillium dahliae*), *Fusarium* spp. (e.g., *Fusarium oxysporum* f. sp. *Fragariae, Fusarium oxysporum* f. sp. *Radicis-cucumerinum*, *Rhizoctonia* spp. (e.g., *Rhizoctonia solani*), *Pythium* spp. (e.g., *Pythium ultimum*).

In one embodiment, the nematode is of the *M. javanica* species (*Meloidogyne javanica*).

In some embodiments, the pathogen is an insect. In some embodiments, the pathogen is a wireworm. In some embodiments, the pathogen is weed.

In some embodiments, the pathogen is an aphid selected from, but is not limited to: *Myzus persicae, Aphis gossypii, Brevicoryne brassicae, Aphis nerii, Bemisia tabaci* and *Rhopalosiphum maidis*.

According to some embodiments of the present invention, the disclosed compounds are for use for reducing growth of a pathogen.

In some embodiments, the term "reducing", or any grammatical derivative thereof, indicates that at least 20%, 30%, 40%, 50%, 60%, 70%, 80%, 90%, or more, reduction of growth or even complete growth inhibition in a given time as compared to the growth in that given time of the pathogen not being exposed to the treatment as described herein.

In some embodiments, the term "completely inhibited", or any grammatical derivative thereof, refers to 100% arrest of growth in a given time as compared to the growth in that given time of the fungi not being exposed to the treatment as described herein.

In some embodiments, the effective concentration (in ppm) for inhibiting, or for killing a nematode is e.g., in the range of 0.1-50, 0.1-200, 0.1-300, 0.1-400, 0.1-500, 0.1-600, 0.1-700, 0.1-800, 0.1-1000, 0.2-50, 0.2-200, 0.2-300, 0.2-400, 0.2-500, 0.2-600, 0.2-700, 0.2-800, 0.2-1000, 0.5-50, 0.5-200, 0.5-300, 0.5-400, 0.5-500, 0.5-600, 0.5-700, 0.5-800, 0.5-1000, 1-50, 1-200, 1-300, 1-400, 1-500, 1-600, 1-700, 1-800, 1-1000, 2-50, 2-200, 2-300, 2-400, 2-500, 2-600, 2-700, 2-800, 2-1000, 5-50, 5-200, 5-300, 5-400, 5-500, 5-600, 5-700, 5-800, 5-1000, 25-50, 25-200, 25-300, 25-400, 25-500, 25-600, 25-700, 25-800, 25-1000, 50-200, 50-300, 50-400, 50-500, 50-600, 50-700, 50-800, or 50-1000 ppm. Each possibility represents a separate embodiment of the invention. In some embodiments, the effective concentration for inhibiting or killing a nematode is 0.2-500 ppm. In some embodiments, the effective concentration for inhibiting or killing a nematode is 1-500 ppm.

In some embodiments, the term "inhibiting", or any grammatical derivative thereof, in the context of nematode refers to the inhibition of a nematode development.

In some embodiments, the compound represented by the structure of general Formula I is for use for inhibiting or for killing a nematode, being at an effective concentration in the range of 0.2-500 ppm. In some embodiments, the compound represented by the structure of general Formula II is for use for inhibiting or for killing a nematode, being at an effective concentration in the range of 0.2-500 ppm. In some embodiments, the compound represented by the structure of general Formula II (a) is for use for inhibiting or for killing a nematode, being at an effective concentration in the range of 0.2-500 ppm. In some embodiments, the compound represented by the structure of general Formula III is for use for inhibiting or for killing a nematode, being at an effective concentration in the range of 0.2-500 ppm. In some embodiments, the compound represented by the structure of general Formula III (a) is for use for inhibiting or for killing a nematode, being at an effective concentration in the range of 0.2-500 ppm. In some embodiments, the compound represented by the structure of general Formula IV is for use for inhibiting or for killing a nematode, being at an effective concentration in the range of 0.2-500 ppm. In some embodiments, the compound represented by the structure of general Formula IV (a) is for use for inhibiting or for killing a nematode, being at an effective concentration in the range of 0.2-500 ppm. In some embodiments, the compound represented by the structure of general Formula V is for use for inhibiting or for killing a nematode, being at an effective concentration in the range of 0.2-500 ppm. In some embodiments, the compound represented by the structure of general Formula V (a) is for use for inhibiting or for killing a nematode, being at an effective concentration in the range of 0.2-500 ppm. In some embodiments, the compound represented by the structure of general Formula VI is for use for inhibiting or for killing a nematode, being at an effective concentration in the range of 1-500 ppm. In some embodiments, the compound represented by the structure of general Formula VII is for use for inhibiting or for killing a nematode, being at an effective concentration in the range of 1-500 ppm. In some embodiments, the compound represented by the structure of general Formula VII (a) is for use for inhibiting or for killing a nematode, being at an effective concentration in the range of 1-500 ppm. In some embodiments, the compound represented by the structure of general Formula VII (b) is for use for inhibiting or for killing a nematode, being at an effective concentration in the range of 1-500 ppm. In some embodiments, the compound represented by the structure of general Formula VII (c) is for use for inhibiting or for killing a nematode, being at an effective concentration in the range of 1-500 ppm. In some embodiments, the compound represented by the structure of general Formula VII (d) is for use for inhibiting or for killing a nematode, being at an effective concentration in the range of 1-500 ppm. In some embodiments, the compound represented by the structure of general Formula VII (e) is for use for inhibiting or for killing a nematode, being at an effective concentration in the range of 1-500 ppm. In some embodiments, the compound represented by the structure of general Formula VII (f) is for use for inhibiting or for killing a nematode, being at an effective concentration in the range of 1-500 ppm. In some embodiments, the compound represented by the structure of general Formula VII (g) is for use for inhibiting or for killing a nematode, being at an effective concentration of 1-500 ppm. In some embodiments, the compound represented by the structure of general Formula VII (h) is for use for inhibiting or for killing a nematode, being at an effective concentration in the range of 1-500 ppm.

In some embodiments, the effective concentration (in ppm) for inhibiting or killing a fungus is in the range of e.g., 0.1-50, 0.1-200, 0.1-300, 0.1-400, 0.1-500, 0.1-600, 0.1-700, 0.1-800, 0.1-1000, 0.1-1500, 0.1-2000, 0.1-2500, 0.1-3000, 0.1-5000, 0.2-50, 0.2-200, 0.2-300, 0.2-400, 0.2-500, 0.2-600, 0.2-700, 0.2-800, 0.2-1000, 0.2-1500, 0.2-2000, 0.2-2500, 0.2-3000, 0.2-5000, 0.5-50, 0.5-200, 0.5-300, 0.5-400, 0.5-500, 0.5-600, 0.5-700, 0.5-800, 0.5-1000, 0.5-1500, 0.5-2000, 0.5-2500, 0.5-3000, 0.5-5000, 1-50, 1-200, 1-300, 1-400, 1-500, 1-600, 1-700, 1-800, 1-1000, 1-1500, 1-2000, 1-2500, 1-3000, 1-5000, 2-50, 2-200, 2-300, 2-400, 2-500, 2-600, 2-700, 2-800, 2-1000, 2-1500, 2-2000, 2-2500, 2-3000, 2-5000, 5-50, 5-200, 5-300, 5-400, 5-500, 5-600, 5-700, 5-800, 5-1000, 5-1500, 5-2000, 5-2500, 5-3000, 5-5000, 25-50, 25-200, 25-300, 25-400, 25-500, 25-600, 25-700, 25-800, 25-1000, 25-1500, 25-2000, 25-2500, 25-3000, 25-5000, 50-200, 50-300, 50-400, 50-500, 50-600, 50-700, 50-800, 50-1000, 50-1500, 50-2000, 50-2500, 50-3000, or 50-5000 ppm. Each possibility represents a separate embodiment of the invention. In some embodiments, the effective concentration for inhibiting or killing a fungus is 0.2-1000 ppm. In some embodiments, the effective concentration for inhibiting or killing a fungus is 0.5-2500 ppm.

In some embodiments, the compound represented by the structure of general Formula I is for use for inhibiting or killing a fungus, being at an effective concentration of e.g., 0.2-2500 ppm. In some embodiments, the compound represented by the structure of general Formula II is for use for inhibiting or killing a fungus, being at an effective concentration of e.g., 0.2-1000 ppm. In some embodiments, the compound represented by the structure of general Formula II (a) is for use for inhibiting or killing a fungus, being at an effective concentration of e.g., 0.2-1000 ppm. In some embodiments, the compound represented by the structure of general Formula III is for use for inhibiting or killing a fungus, being at an effective concentration of e.g., 0.2-1000 ppm. In some embodiments, the compound represented by the structure of general Formula III (a) is for use for inhibiting or killing a fungus, being at an effective concentration of e.g., 0.2-1000 ppm. In some embodiments, the compound represented by the structure of general Formula IV is for use for inhibiting or killing a fungus, being at an effective concentration of e.g., 0.2-1000 ppm. In some embodiments, the compound represented by the structure of general Formula IV (a) is for use for inhibiting or killing a fungus, being at an effective concentration of e.g., 0.2-1000 ppm. In some embodiments, the compound represented by the structure of general Formula V is for use for inhibiting or killing a fungus, being at an effective concentration of e.g., 0.2-1000 ppm. In some embodiments, the compound represented by the structure of general Formula V (a) is for use for inhibiting or killing a fungus, being at an effective concentration of e.g., 0.2-1000 ppm. In some embodiments, the compound represented by the structure of general Formula VI is for use for inhibiting or killing a fungus, being at an effective concentration of e.g., 0.5-2500 ppm. In some embodiments, the compound represented by the structure of general Formula VII is for use for inhibiting or killing a fungus, being at an effective concentration of e.g., 0.5-2500 ppm. In some embodiments, the compound represented by the structure of general Formula VII (a) is for use for inhibiting or killing a fungus, being at an effective concentration of e.g., 0.5-2500 ppm. In some embodiments, the compound represented by the structure of general Formula VII (b) is for use for inhibiting or killing a fungus, being at an effective concentration of e.g., 0.5-2500 ppm. In some embodiments, the compound represented by the structure of general Formula VII (c) is for use for inhibiting or killing a fungus, being at an effective concentration of e.g., 0.5-2500 ppm. In some embodiments, the compound represented by the structure of general Formula VII (d) is for use for inhibiting or killing a fungus, being at an effective concentration of e.g., 0.5-2500 ppm. In some embodiments, the compound represented by the structure of general Formula VII (e) is for use for inhibiting or killing a fungus, being at an effective concentration of e.g., 0.5-2500 ppm. In some embodiments, the compound represented by the structure of general Formula VII (f) is for use for inhibiting or killing a fungus, being at an effective concentration of e.g., 0.5-2500 ppm. In some embodiments, the compound represented by the structure of general Formula VII (g) is for use for inhibiting or killing a fungus, being at an effective concentration of e.g., 0.5-2500 ppm. In some embodiments, the compound represented by the structure of general Formula VII (h) is for use for inhibiting or killing a fungus, being at an effective concentration of e.g., 0.5-2500 ppm.

In some embodiments, the term "compound" refers to a mixture of cis and trans-configurations.

In some embodiments, the compound is characterized by at least 70%, at least 80%, at least 90% or at least 95%, including any value therebetween, being in the form of trans-configuration.

In some embodiments, the compound is in the form of cis-configuration.

In some embodiments, there is provided a composition comprising one or more compounds disclosed herein.

In some embodiments, a composition of the invention comprises a compound disclosed herein, such as trans-2-octenal, at an amount of at least 1% by weight, at least 5% by weight, at least 10% by weight, at least 15% by weight, at least 20% by weight, at least 25% by weight, at least 30% by weight, at least 35% by weight, at least 40% by weight, at least 45% by weight, at least 50% by weight, or any value or range therebetween. In some embodiments, the composition comprises a compound disclosed herein, such as trans-2-octenal, at an amount ranging from 20-35% by weight, 30-45% by weight, 40-50% by weight, 20-50% by weight, 25-45% by weight, 30-42% by weight, or 35-45% by weight. Each possibility represents a separate embodiment of the invention.

In some embodiments, a composition of the invention comprises a deodorizing compound. In some embodiments, the deodorizing compound suppresses the odour of one or more compounds disclosed herein. In some embodiments, the deodorizing compound neutralizes the odour of a compound disclosed herein. In some embodiments, the deodorizing compound is an ester. In some embodiments, the deodorizing compound is isoamyl acetate.

In some embodiments, a composition of the invention comprises a deodorizing compound, such as isoamyl acetate, at an amount of at least 35% by weight, at least 40% by weight, at least 45% by weight, at least 50% by weight, at least 55% by weight, at least 60% by weight, at least 65% by weight, at least 70% by weight, at least 75% by weight, or any value or range therebetween. In some embodiments, the composition comprises a deodorizing compound, such as isoamyl acetate, at an amount ranging from 40-55% by weight, 45-65% by weight, 40-70% by weight, 50-75% by weight, 55-65% by weight, 45-60% by weight, or 55-80% by weight. Each possibility represents a separate embodiment of the invention.

In some embodiments, the composition comprises a compound disclosed herein, such as trans-2-octenal and isoamyl acetate at ratio of at least 1:1.5 by weight, at least 1:2 by weight, at least 1:3 by weight, at least 1:4 by weight, at least 1:5 by weight, or any range or value therebetween. In some embodiments, the composition comprises a compound disclosed herein, such as trans-2-octenal and isoamyl acetate at a ratio ranging from 1:1.5 by weight to 1:2 by weight, 1:2 by weight to 1:3.5 by weight, 1:1.5 by weight to 1:4 by weight, 1:3 by weight to 1:5 by weight, 1:1.75 by weight to 1:3.5 by weight, or 1:2.5 by weight to 1:5 by weight. Each possibility represents a separate embodiment of the invention.

In some embodiments, the composition further comprises a solvent and one or more surfactants.

In some embodiments, the solvent is a glycol ether solvent. In some embodiments, the glycol ether solvent comprises an aliphatic diol. In some embodiments, an aliphatic diol comprises dipropylene glycol. As used herein, dipropylene glycol encompasses a mixture comprising 4-oxa-2,6-heptandiol, 2-(2-hydroxy-propoxy)-propan-1-ol, 2-(2-hydroxy-1-methyl-ethoxy)-propan-1-ol, or any combination thereof.

In some embodiments, the composition comprises a glycol ether solvent at an amount of at least 5%, 6%, 7%, 8%, 9%, 10%, 11%, 12%, 13%, 14%, 15% by weight, or any value or range therebetween. In some embodiments, the composition comprises a glycol ether solvent at an amount ranging from 5-12% by weight, 5-13% by weight, 5-15% by weight, 6-15% by weight, 8-13% by weight, 9-14% by weight, 6-11% by weight, 9-12% by weight, 8-14% by weight, 10-15% by weight, 5-9% by weight, 11-15% by weight, or 7-12% by weight. Each possibility represents a separate embodiment of the invention.

In some embodiments, one or more surfactants comprises at least 2, at least 3, at least 4, at least 5, or any range therebetween. In some embodiments, one or more surfactants comprises a range of 1 to 2, 1 to 3, 1 to 4, 2 to 3, 2 to 4, 2 to 5, 3 to 4, 3 to 5, or 4 to 5. Each possibility represents a separate embodiment of the invention. In some embodiments, a composition comprising one or more surfactant comprises one or more anionic surfactant and one or more nonionic surfactant.

As used herein, the term "surfactant" refers to any anionic surfactants or nonionic surfactants.

The term "anionic surfactant" refers to any surfactant containing an anionic functional group including sulfate, sulfonate, phosphate, and carboxylates. Non-limiting examples of anionic surfactants include, but are not limited to, alkylbenzenesulfonate, ammonium lauryl sulfate, sodium lauryl sulfate (sodium dodecyl sulfate, SLS, or SDS), sodium laureth sulfate (sodium lauryl ether sulfate or SLES), sodium myreth sulfate, dioctyl sodium sulfosuccinate (Docusate), perfluorooctanesulfonate (PFOS), perfluorobutanesulfonate, alkylaryl ether phosphates, alkyl ether phosphates, sodium stearate, sodium lauroyl sarcosinate, perfluorononanoate, and perfluorooctanoate (PFOA or PFO). In some embodiments, the anionic surfactant is a linear alkylbenzenesulfonate.

In some embodiments, the composition comprises an anionic surfactant, such as a linear alkylbenzenesulfonate, at an amount of at least 2%, at least 3%, at least 4%, at least 5%, at least 6%, at least 7%, at least 8%, at least 9%, at least 10%, or any value or range therebetween. In some embodiments, the composition comprises an anionic surfactant, such as a linear alkylbenzenesulfonate, at an amount ranging from 2-7%, 2-8%, 2-10%, 3-9%, 5-10%, 4-8%, 5-9%, 6-10%, 2-6%, or 8-10%. Each possibility represents a separate embodiment of the invention.

The term "nonionic surfactant" refers to any surfactant having covalently linked oxygen-containing hydrophilic groups, which are bonded to hydrophobic parent structures. Non-limiting examples of nonionic surfactants include, but are not limited to, ethoxylated castor oil, narrow-range ethoxylate, octaethylene glycol monododecyl ether, pentaethylene glycol monododecyl ether, nonoxynols, triton X-100, polyethoxylated tallow amine, cocamide monoethanolamine, cocamide diethanolamine, poloxamers, glycerol monostearate, glycerol monolaurate, sorbitan monolaurate, sorbitan monostearate, sorbitan tristearate, tween (e.g., tween 20, 40, 60, and 80), decyl glucoside, lauryl glucoside, octyl glucoside, lauryldimethylamine oxide, dimethyl sulfoxide, phosphine oxide, and others. In some embodiments, the nonionic surfactant is an ethoxylated castor oil.

In some embodiments, the composition comprises a nonionic surfactant, such as ethoxylated castor oil, at an amount of at least 5%, at least 6%, at least 7%, at least 8%, at least 9%, at least 10%, at least 11%, at least 12%, at least 13%, at least 14%, at least 15%, or any value or range therebetween. In some embodiments, the composition comprises a nonionic surfactant, such as a ethoxylated castor oil, at an amount ranging from 5-10%, 7-14%, 9-15%, 8-12%, 5-15%, 6-13%, 7-11%, 8-15%, 9-13%, or 10-15%. Each possibility represents a separate embodiment of the invention.

In some embodiments, there is provided a composition for use in killing a pathogen or reducing growth thereof.

In another aspect, the present disclosure provides a method for killing a pathogen or reducing growth thereof. In some embodiments, the method comprises exposing the pathogen to an effective concentration of the compounds and/or composition. In some embodiments, the method is for killing a soil pathogen. In some embodiments, the method is for reducing a soil pathogen growth. In some embodiments, the method is for reducing overall damage to a plant or plant part. In some embodiments, the method is for reducing pathogen growth.

In another aspect, the present disclosure provides a method for killing a pathogen or reducing growth thereof by administering to a plant or soil, the compounds described herein (e.g., trans-2-octenal) and/or a compositions comprising the compounds described herein (trans-2-octenal) and a deodorizing compound. In some embodiments, the deodorizing compound is isoamyl acetate. In some embodiments, the compound and the deodorizing compound are at a ratio of at least 1:1.5 by weight.

According to some embodiments, the disclosed method is directed to storing a plant or plant part, comprising exposing a post-harvest plant or plant part to an effective amount of the compounds and/or compositions comprising thereof.

As used herein, the term "exposing" comprises: immersion, coating, dipping, spraying, evaporation, fogging, scattering, painting, injecting, or any combination thereof.

In some embodiments, the plant or plant part is pre-harvested.

The disclosed compositions set forth above may be formulated in any manner. Non-limiting formulation examples include but are not limited to Dried grains, Emulsifiable concentrates (EC), Wettable powders (WP), Soluble liquids (SL), Aerosols, Ultra-low volume concentrate solutions (ULV), Soluble powders (SP), Microencapsulation, Water dispersed granules (WDG), Flowables (FL), Microemulsions (ME), Nano-emulsions (NE), etc. In any formulation described herein, percent of the active ingredient is well within the skills of the artisan e.g., within a range of 0.01% to 99.99%.

In some embodiments, the composition is in the form of, but not limited to, a liquid, gel, solid or biofumigant. In some embodiments, the composition comprises a surfactant to be used for the purpose of emulsification, dispersion, wetting, spreading, integration, disintegration control, stabilization of active ingredients, and improvement of fluidity or rust inhibition. In some embodiments, the surfactant is a non-phytotoxic non-ionic surfactant. In one embodiment, the carrier is a perlite particle.

In some embodiments, the composition is applied to the soil using methods known in the art. These include but are not limited to: (a) drip irrigation or chemigation; (b) soil incorporation; (c) seed treatment.

In some embodiments, the composition is applied to plants. In some embodiments, the composition is applied to plant parts. In some embodiments, the plant or plant part may be pre-harvest (rooted in the soil or hydroponics, open field, greenhouse etc.) or post-harvest. In some embodiments, the composition is applied to desired and undesired wild plants or crop plants (including naturally occurring crop plants). In some embodiments, the composition is applied to one or more plant parts selected from, but not limited to: shoot, leaf, flower, root, leaves, needles, stalks, stems, flowers, fruit bodies, seeds, roots, harvested material, vegetative and generative propagation material tubers, cuttings, offshoots, rhizomes and all parts and organs of plants above and below the ground.

In some embodiments, the composition is exposed to the pathogen, soil, plant or part thereof. By "exposing" it is meant to refer to contacting directly or, in some embodiments, allowing the composition to act on their surroundings, habitat or storage space by, for example, immersion, coating, dipping, spraying, evaporation, fogging, scattering, painting on, or by injecting.

In some embodiments, the disclosed composition may be used as pesticides and in particular, may be used as e.g., nematicides, fungicides, insecticides, herbicides, or bactericides, alone or in combination with one or more pesticidal substances set forth above or known in the art.

In some embodiments, the disclosed composition may be applied to soil, plants or plant parts. In some embodiments, applying to the soil comprises application at a depth of 0-5 cm below the ground surface, 4-25 cm below the ground surface, 20-55 cm below the ground surface, 50-90 cm below the ground surface, 85-150 cm below the ground surface. In some embodiments, applying to the soil comprises application at a depth of at least 5 cm, at least 15 cm, at least 35 cm, at least 50 cm below the ground level, or any value or range therebetween. Each possibility represents a separate embodiment of the invention.

In some embodiments, the composition may be combined with compounds, but not limited to, amino acids, chitosan, chitin, starch, hormones, minerals, to increase efficacy.

According to another aspect of embodiments of the invention, there is provided a pharmaceutical composition comprising one or more compounds as in Formulae I to VII, in an embodiment thereof and a pharmaceutically acceptable carrier.

According to an aspect of embodiments of the invention there is provided a method of treating a medical condition associated with any disease, medical condition, or disorder as described herein throughout in a subject in need thereof, the method comprising administering to the subject a therapeutically effective amount of one or more compounds as described herein.

The terms "pharmaceutical composition" or "pharmaceutical product" are also to be construe to encompass cosmetic or cosmeceutical product and nutrient or nutraceutical product.

Definitions

As used herein, the term "alkyl" describes an aliphatic hydrocarbon including straight chain and branched chain groups. Preferably, the alkyl group has 21 to 100 carbon atoms, and more preferably 21-50 carbon atoms. Whenever a numerical range; e.g., "21-100", is stated herein, it implies that the group, in this case the alkyl group, may contain 21 carbon atom, 22 carbon atoms, 23 carbon atoms, etc., up to and including 100 carbon atoms. In the context of the present invention, a "long alkyl" is an alkyl having at least 20 carbon atoms in its main chain (the longest path of continuous covalently attached atoms). A short alkyl therefore has 20 or less main-chain carbons. The alkyl can be substituted or unsubstituted, as defined herein.

The term "alkyl", as used herein, also encompasses saturated or unsaturated hydrocarbons, hence this term further encompasses alkenyl and alkynyl.

The term "alkenyl" describes an unsaturated alkyl, as defined herein, having at least two carbon atoms and at least one carbon-carbon double bond. The alkenyl may be substituted or unsubstituted by one or more substituents, as described hereinabove.

The term "alkynyl", as defined herein, is an unsaturated alkyl having at least two carbon atoms and at least one carbon-carbon triple bond. The alkynyl may be substituted or unsubstituted by one or more substituents, as described hereinabove.

The term "cycloalkyl" describes an all-carbon monocyclic or fused ring (i.e., rings which share an adjacent pair of carbon atoms) group where one or more of the rings does not have a completely conjugated pi-electron system. The cycloalkyl group may be substituted or unsubstituted, as indicated herein. The cycloalkyl group may also encompasses saturated or unsaturated cyclic hydrocarbons, such as cycloalkenyl and cycloalkynyl.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted, as indicated herein.

The term "alkoxy" describes both an —O-alkyl and an —O-cycloalkyl group, as defined herein.

The term "aryloxy" describes an —O-aryl, as defined herein.

Each of the alkyl, cycloalkyl and aryl groups in the general formulas herein may be substituted by one or more substituents, whereby each substituent group can independently be, for example, halide, alkyl, alkoxy, cycloalkyl, alkoxy, nitro, amine, hydroxyl, thiol, thioalkoxy, thiohydroxy, carboxy, amide, aryl and aryloxy, depending on the substituted group and its position in the molecule. Additional substituents are also contemplated.

The term "halide", "halogen" or "halo" describes fluorine, chlorine, bromine or iodine.

The term "haloalkyl" describes an alkyl group as defined herein, further substituted by one or more halide(s).

The term "haloalkoxy" describes an alkoxy group as defined herein, further substituted by one or more halide(s).

The term "hydroxyl" or "hydroxy" describes a —OH group.

The term "thiohydroxy" or "thiol" describes a —SH group.

The term "thioalkoxy" describes both an —S-alkyl group, and a —S-cycloalkyl group, as defined herein.

The term "thioaryloxy" describes both an —S-aryl and a —S-heteroaryl group, as defined herein.

The term "amine" describes a —NR'R" group, with R' and R" as described herein.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furane, thiophene, imidazole, oxazole, thiazole, pyrazole, pyridine, pyrimidine, quinoline, isoquinoline and purine.

The term "heteroalicyclic" or "heterocyclyl" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino and the like.

The term "carboxy" or "carboxylate" describes a —C(=O)—OR' group, where R' is hydrogen, alkyl, cycloalkyl, alkenyl, aryl, heteroaryl (bonded through a ring carbon) or heteroalicyclic (bonded through a ring carbon) as defined herein.

The term "carbonyl" describes a —C(=O)—R' group, where R' is as defined hereinabove.

The above-terms also encompass thio-derivatives thereof (thiocarboxy and thiocarbonyl).

The term "thiocarbonyl" describes a —C(=S)—R' group, where R' is as defined hereinabove.

A "thiocarboxy" group describes a —C(=S)—OR' group, where R' is as defined herein.

A "sulfinyl" group describes an —S(=O)—R' group, where R' is as defined herein.

A "sulfonyl" or "sulfonate" group describes an —S(=O)2-R' group, where Rx is as defined herein.

A "carbamyl" or "carbamate" group describes an —OC(=O)—NR'R" group, where R' is as defined herein and R" is as defined for R'.

A "nitro" group refers to a —NO$_2$ group.

A "cyano" or "nitrile" group refers to a —C≡N group.

As used herein, the term "azide" refers to a —N$_3$ group.

The term "sulfonamide" refers to a —S(=O)$_2$—NR'R" group, with R' and R" as defined herein.

The term "phosphonyl" or "phosphonate" describes an —O—P(=O)(OR')$_2$ group, with R' as defined hereinabove.

The term "phosphinyl" describes a —PR'R" group, with R' and R" as defined hereinabove.

The term "alkaryl" describes an alkyl, as defined herein, which substituted by an aryl, as described herein. An exemplary alkaryl is benzyl.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furane, thiophene, imidazole, oxazole, thiazole, pyrazole, pyridine, pyrimidine, quinoline, isoquinoline and purine. The heteroaryl group may be substituted or unsubstituted by one or more substituents, as described hereinabove. Representative examples are thiadiazole, pyridine, pyrrole, oxazole, indole, purine and the like.

As used herein, the terms "halo" and "halide", which are referred to herein interchangeably, describe an atom of a halogen, that is fluorine, chlorine, bromine or iodine, also referred to herein as fluoride, chloride, bromide and iodide.

The term "haloalkyl" describes an alkyl group as defined above, further substituted by one or more halide(s).

General

As used herein the term "about" refers to ±10%.

The terms "comprises", "comprising", "includes", "including", "having" and their conjugates mean "including but not limited to". The term "consisting of" means "including and limited to". The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, agrochemical, pharmacological, biological, biochemical and medical arts.

As used herein, the term "treating" includes abrogating, substantially inhibiting, slowing or reversing the progression of a phytopathological condition.

In those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples which, together with the above descriptions, illustrate the invention in a non-limiting fashion.

A collection of small molecules as cyclic ketones, aliphatic aldehydes, ketones, alcohols, alkenes and non-linear alkenes also with different moieties as listed in Table 1 below, and Table 2 were tested for nematocidal and fungicidal activity. Different molecular structure features, such as the length of the carbohydrate chain, the molecule linearity, the presence of a carbonyl group, aryl or methyl and more were examined in order to find the most efficient nematicide and fungicide compositions.

Example 1

Cyclic Ketones and Alkene Carbonyls as Nematocides

Materials and Experimental Methods

In exemplary procedures, the sedentary root-knot nematode from the genus *Meloidogyne javanica* second stage juveniles (J2s) was propagated on greenhouse-grown nematode-susceptible tomato *Lycopersicon esculentum* cv. 'Avigail 870' (Hazera, Shikmim, Israel), and nematode eggs were bulk-extracted from the roots with 0.05% (v/v) sodium hypochlorite (NaOCl) followed by sucrose flotation and successive sievings through nylon filters of 300, 120, 60, and 30 μm mesh sizes (AD Sinun Technologies, Petach Tikvah, Israel). For hatching J2, extracted eggs were placed on 30-μm sieves (AD Sinun Technologies) in 0.01 M MES (2-(N-morpholino) ethanesulfonic acid hydrate) pH 6.5 buffer under aseptic conditions in darkness for 5 days, and hatching J2s were collected for further experiments.

Seven vials, each containing 300 J2 nematodes with 0.5 mL of 0.01 M 2-(N-morpholino)ethanesulfonic acid (MES) buffer, were exposed to cyclic ketone compounds in order to examine their nematocidal activity and reduction in viability. In addition, a humid environment in a sealed 1 L box was maintained by addition 5 ml of distilled $H_2O$ to a 50-mm Petri plate. The box was sealed after compound addition into each 50-mm Petri plate together with 5-250 mg of perlite particles and incubated for 2 days in the dark at 25±1° C. C5 and C6 saturated and α,β-unsaturated cyclic ketones were tested for their nematocidal activity. The J2 nematodes viability was examined following exposure to the cyclic ketone compounds, by a straightforward small-scale nematode extraction method, based on the traditional Baermann funnel method. Briefly, all nematode suspensions were loaded onto 30-μm (AD Sinun Technologies) filters (1.0-1.5 cm height, 1.1-2.0 $cm^3$ internal area), and the nematodes were washed twice with 300 μL of 0.01 M MES buffer in order to remove any residues. Then, filters holding nematodes were placed into 15 mL Falcon centrifuge tubes, each containing 900 μL of 0.01 M of MES buffer. These filters allow active passage of only living J2s while paralyzed or dead nematodes remain on top of the filter. The whole apparatus including the filter holding the nematodes and the Falcon tubes were placed in the dark for 3 h at 25±1° C. Then, the filters were removed and the viable nematodes, which were able to actively cross the filter toward the 0.01 M of MES buffer, were collected from the Falcon tube and counted using a Nematode Counting Slide (Chalex LLC, Portland, OR, USA) and a SV11 stereomicroscope (Zeiss, Jena, Germany).

Data were analyzed by the JMP 12 software package (SAS Inc., Cary, NC, USA). Mean numbers of viable J2s under various conditions were subjected to one-way analysis of variance (ANOVA), followed by the Tukey-Kramer multiple comparison test, with significance set at $P<0.05$.

Results

Figure 1B:
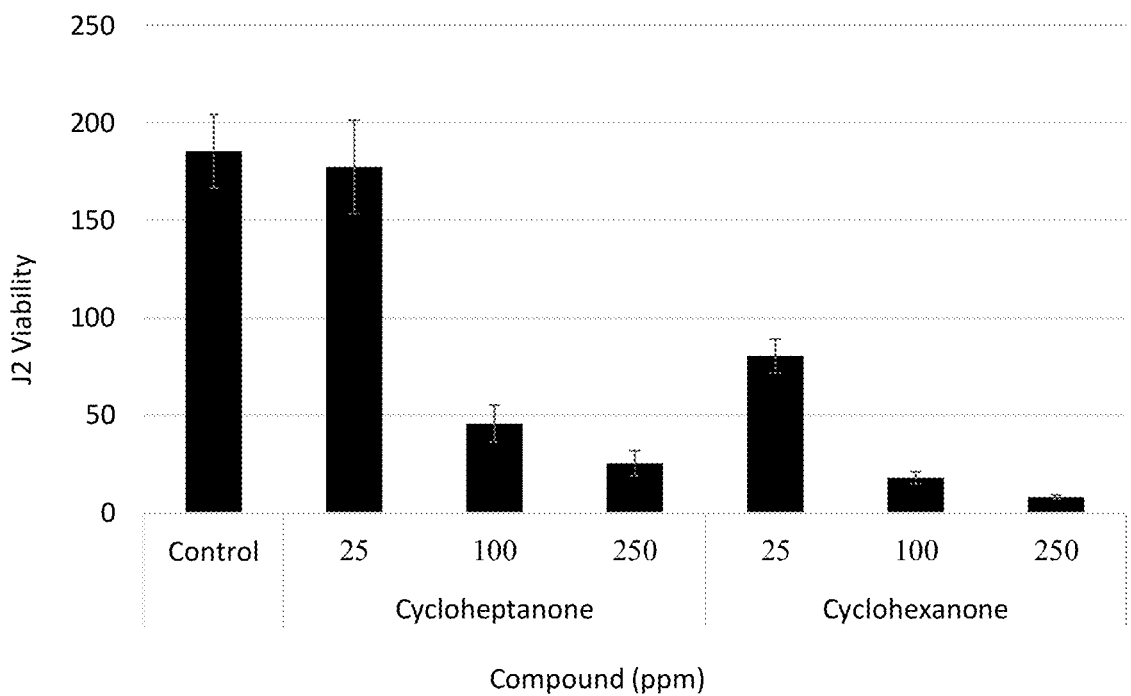

As shown in FIGS. 1A-1B and in Table 1, cyclohexanone and cycloheptanone (saturated C6 and C7 cyclic ketones) showed nematocidal effects at substantially higher concentrations, when compared to 2-cyclopenten-1-one and 2-cyclohexen-1-one (C5 and C6 unsaturated cyclic ketones). Thus, the presence of an α,β-unsaturated ring in cyclohexenone and cyclopentenone showed a beneficial influence in nematocidal activity when compared with the saturated compounds.

Figure 1C:
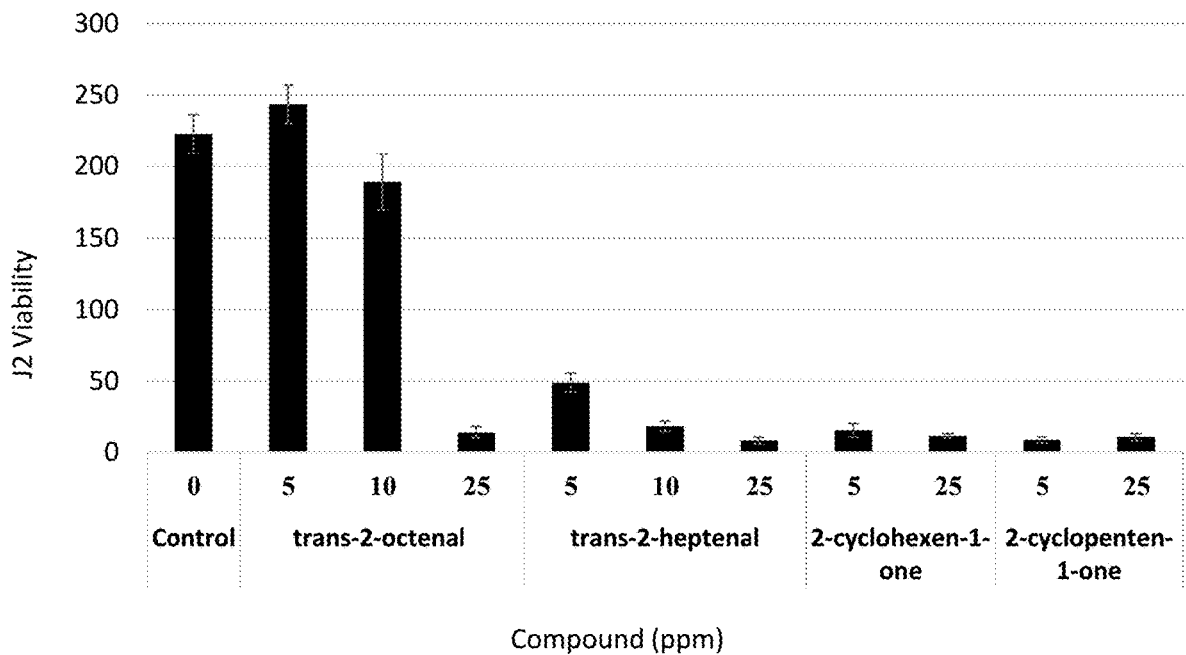

FIG. 1C and Table 1 show that 2-cyclopenten-1-one and 2-cyclohexen-1-one have similar nematocidal effects. However, trans-2-octenal was found to be a relatively less potent nematicide than trans-2-heptenal and than the C5 and C6 α,β-unsaturated cyclic ketones.

Without being bound by any particular mechanism, it is assumed that the nematocidal activity is negatively affected by: (a) the presence of a longer carbohydrate chain in the alkene aldehydes; (b) the absence of a cycloalkyl moiety; (c) the absence of a carbonyl group; and (d) the hydrogenation of the conjugated carbonyl alkene group (converting an α,β-conjugated unsaturated carbonyl compound into a saturated carbonyl compound); as can be concluded from Table 1.

TABLE 1

| Nematocidal activity | | | |
|---|---|---|---|
| Activity | Concentration range (ppm) | Molecular structure | Chemical |
| S 2.5 | 1-500 | C5 alkene aldehyde | trans-2-pentenal |
| S 2.5 | 1-25 | C6 alkene aldehyde | trans-2-hexen-1-al |
| S 10 | 5-500 | C7 alkene aldehyde | trans-2-heptenal |
| M 25 | 5-500 | C8 alkene aldehyde | trans-2-octenal |
| N 25 | 5-25 | C9 alkene aldehyde | trans-2-nonenal |
| N 25 | 5-25 | C10 alkene aldehyde | trans-2-decenal |

TABLE 1-continued

Nematocidal activity

| Activity | Concentration range (ppm) | Molecular structure | Chemical |
|---|---|---|---|
| M 25 | 5-25 | C5 alkene aldehyde with methyl | Tiglic aldehyde |
| M 25 | 5-25 | C5 alkene with cyano moiety | 3-pentenenitrile |
| N 25 | 5-25 | C8 alkyl aldehyde | Octanal |
| N 25 | 5-25 | C9 alkyl aldehyde | Nonanal |
| N 25 | 5-25 | C10 alkyl aldehyde | Decanal |
| N 500 | 250-500 | | Citral |
| L 500 | 250-500 | C7 alkene with carboxylic acid | trans-2-heptanol |
| N 500 | 250-500 | C8 alkene with carboxylic acid | trans-2-octenoic acid |
| N 500 | 250-500 | C8 alkene with hydroxy group | trans-2-octen-1-ol |
| M 250 | 250-500 | C8 alkene ketone | trans-3-octen-2-one |
| N 500 | 250-500 | C8 alkene ester | Methyl trans-2-octenoate |
| N 250 | 250 | Aldehyde with aryl | p-Anisaldehyde |
| N 250 | 250 | Alkene aldehyde with aryl | trans-cinnamaldehyde |
| M 100 | 25-250 | C7 ketone | 4-heptanone |
| N 250 | 250 | C7 ketone with methyl moieties | 2,6-dimethyl-4-heptanone |
| S 1 | 0.25-25 | C5 α,β-unsaturated cyclic ketone | 2-cyclopenten-1-one |
| S 2.5 | 1-25 | C6 α,β-unsaturated cyclic ketone | 2-cyclohexen-1-one |
| S 100 | 25-250 | C6 saturated cyclic ketone | Cyclohexanone |
| M 100 | 25-250 | C7 saturated cyclic ketone | Cycloheptanone |
| N 25 | 5-25 | C6 saturated cyclic ketone with aryl moiety | α-Tetralone |
| N 250 | 250 | | R-(−)-Carvone |
| N 250 | 250 | Alkene ketone with heteroaryl | α-ionone |
| N 250 | 250 | Alkene ester with aryl | Ethyl cinnamate |
| N 250 | 250 | | Farnesal mixture of isomers |
| N 250 | 250 | | Farnesol |

Tables abbreviations:
S >90% reduction in viability
M 76-90% reduction in viability
L 51-75% reduction in viability
N <50% reduction in viability
Activity The most effective concentration (ppm)
e.g., S 2.5 means that a concentration of 2.5 ppm of the tested chemical resulted in more than 90% reduction in J2s viability relative to non exposed control J2s Example 2

Alkene Carbonyls and Cyclic Ketones as Fungicides

Materials and Experimental Methods

In exemplary procedures, the fungicidial activity of the compounds listed in Table 2 were examined by activity assays as follow: Petri dishes, 90 mm in diameter, with air volume of 80 mL, contained 10-12 mL of growth medium comprising potato dextrose agar (PDA) (Acumedia, Lansing, Michigan, USA) amended with tetracycline at 12 μg/mL. Each compound was placed on a disconnected cover from an Eppendorf tube that was located in the middle of the Petri dish and a hyphae-containing plug of each test fungus was added to the culture plate. In exemplary procedures, the tested compounds trans-2-heptenal, trans-2-octenal were tested in comparison with octanal, trans-2-octen-1-ol, methyl trans-2-octenoate, trans-3-octen-2-one and 3-pentenenitrile. In addition, cyclic ketones as 2-cyclopenten-1-one, 2-cyclohexen-1-one and α-tetralone were also examined. Then, the culture plate was sealed with parafilm and incubated at room-temperature for 2 days, after which the growth of the test fungi in those dishes was compared with those in the test compound-free control dishes. At the end of the assay, the viability of each test fungus was evaluated by transferring inoculum plugs to fresh PDA plates and observing the growth that developed within the next 2 days. The test fungi used in this study included but were not limited to *Alternaria alternata, Botrytis cinerea, Sclerotinia rolfsii, Penicillium digitatum, Fusarium oxysporum* f. sp. *radicis-cucumerinum* and *Rhizoctonia solani*.

Results

The results of the fungicidial activity of the compounds are presented in FIGS. 2A-E and in Table 2.

TABLE 2

| Chemical | Molecular structure | Concentration range (ppm) | Tested fungi* A I | A M | B I | B M | S I | S M | P I | P M | F I | F M | R I | R M |
|---|---|---|---|---|---|---|---|---|---|---|---|---|---|---|
| trans-2-pentenal | C5 alkene aldehyde | 3.125-1250 | SI 25 | 25 | SI 25 | 25 | SI 25 | 25 | SI 25 | 25 | SI 12.5 | 25 | SI 25 | 25 |
| trans-2-hexen-1-al | C6 alkene aldehyde | 6.25-25 | ND | | ND | | SI 6.25 | 12.5 | ND | | SI 6.25 | 25 | SI 6.25 | 12.5 |
| trans-2-heptenal | C7 alkene aldehyde | 3.125-2500 | SI 12.5 | 12.5 | SI 25 | 125 | SI 6.25 | 6.25 | SI 12.5 | 12.5 | SI 6.25 | 12.5 | SI 6.25 | 12.5 |
| trans-2-octenal | C8 alkene aldehyde | 3.125-1250 | SI 12.5 | 12.5 | SI 25 | 50 | SI 6.25 | 6.25 | SI 12.5 | 12.5 | SI 6.25 | 6.25 | SI 6.25 | 6.25 |
| trans-2-nonenal | C9 alkene aldehyde | 6.25-25 | ND | | ND | | SI 12.5 | NA 25 | ND | | SI 6.25 | 6.25 | SI 25 | NA 25 |
| trans-2-decenal | C10 alkene aldehyde | 6.25-25 | ND | | ND | | LI 25 | NA 25 | ND | | SI 12.5 | NA 25 | LI 12.5 | NA 25 |
| Lauric aldehyde | C12 alkene aldehyde | 6.25-25 | ND | | ND | | NI 25 | NA 25 | ND | | NI 25 | NA 25 | NI 25 | NA 25 |
| Tiglic aldehyde | C5 alkene aldehyde with methyl | 6.25-25 | ND | | ND | | MI 25 | NA 25 | ND | | NI 25 | NA 25 | MI 25 | NA 25 |
| 3-pentene-nitrile | C5 alkene with cyano moiety | 6.25-25 | ND | | ND | | NI 25 | NA 25 | ND | | NI 25 | NA 25 | NI 25 | NA 25 |
| Octanal | C8 alkyl aldehyde | 6.25-25 | ND | | ND | | SI 12.5 | NA 25 | ND | | SI 25 | NA 25 | SI 12.5 | 12.5 |
| Nonanal | C9 alkyl aldehyde | 6.25-25 | ND | | ND | | SI 12.5 | 25 | ND | | SI 25 | NA 25 | SI 25 | NA 25 |
| Decanal | C10 alkyl aldehyde | 6.25-25 | ND | | ND | | LI 25 | NA 25 | ND | | MI 25 | NA 25 | LI 25 | NA 25 |
| Citral | | 12.5-125 | SI 25 | 25 | SI 25 | 25 | SI 25 | 25 | LI 125 | NA 125 | ND | | ND | |
| trans-2-heptanol | C7 alkene with carboxylic acid | 25-2500 | SI 125 | 500 | SI 125 | 500 | SI 125 | 500 | SI 125 | 1250 | ND | | ND | |
| trans-2-octenoic acid | C8 alkene with carboxylic acid | 12.5-125 | NI 125 | NA 125 | MI 80 | NA 125 | LI 12.5 | NA 125 | NI 125 | NA 125 | ND | | ND | |
| trans-2-octen-1-ol | C8 alkene with hydroxy group | 12.5-1250 | SI 50 | 125 | SI 50 | 500 | SI 50 | 80 | SI 25 | 50 | ND | | ND | |
| trans-3-octen-2-one | C8 alkene ketone | 12.5-1250 | SI 50 | 50 | SI 50 | 50 | SI 25 | 50 | SI 12.5 | 50 | ND | | ND | |
| Methyl trans-2-octenoate | C8 alkene ester | 125-1250 | SI 125 | 125 | SI 125 | 125 | SI 125 | 125 | SI 125 | 125 | ND | | ND | |
| p-Anisaldehyde | Aldehyde with aryl | 12.5-1250 | NI 1250 | NA 1250 | NI 1250 | NA 1250 | NI 1250 | NA 1250 | NI 1250 | NA 1250 | ND | | ND | |
| trans-cinnamaldehyde | Alkene aldehyde with aryl | 12.5-1250 | SI 1250 | 1250 | LI 625 | NA 1250 | NI 1250 | NA 1250 | LI 1250 | NA 1250 | ND | | ND | |
| 4-heptanone | C7 ketone | 25-2500 | SI 1250 | 2500 | SI 500 | 1250 | SI 500 | 2500 | SI 500 | NA 2500 | ND | | ND | |
| 2,6-dimethyl-4-heptanone | C7 ketone with methyl moieties | 25-2500 | SI 1250 | NA 2500 | SI 500 | NA 2500 | SI 500 | 2500 | SI 1250 | NA 2500 | ND | | ND | |
| 2-cyclopenten-1-one | C5 α,β-unsaturated cyclic ketone | 3.125-25 | ND | | ND | | MI 25 | NA 25 | ND | | NI 25 | NA 25 | NI 25 | NA 25 |

TABLE 2-continued

| Chemical | Molecular structure | Concentration range (ppm) | Tested fungi* | | | | | | | | | | | |
|---|---|---|---|---|---|---|---|---|---|---|---|---|---|---|
| | | | A | | B | | S | | P | | F | | R | |
| | | | I | M | I | M | I | M | I | M | I | M | I | M |
| 2-cyclo-hexen-1-one | C6 α,β-unsaturated cyclic ketone | 3.125-25 | ND | | ND | | MI 25 | NA 25 | ND | | NI 25 | NA 25 | NI 25 | NA 25 |
| Cyclohexanone | C6 saturated cyclic ketone | 25-2500 | SI 1250 | 1250 | SI 500 | 500 | SI 500 | 500 | SI 500 | 500 | LI 250 | NA 250 | LI 250 | NA 250 |
| Cyclo-heptanone | C7 saturated cyclic ketone | 25-2500 | SI 1250 | 1250 | SI 1250 | 1250 | SI 1250 | 2500 | SI 2500 | 2500 | MI 250 | NA 250 | MI 250 | NA 250 |
| α-Tetralone | C6 saturated cyclic ketone with aryl moiety | 3.125-25 | ND | | ND | | NI 25 | NA 25 | ND | | NI 25 | NA 25 | NI 25 | NA 25 |
| R-(-)-Carvone | | 12.5-1250 | SI 125 | NA 1250 | MI 25 | NA 1250 | MI 125 | NA 1250 | MI 625 | NA 1250 | ND | | ND | |
| α-ionone | Alkene ketone with heteroaryl | 12.5-1250 | LI 1250 | NA 1250 | LI 1250 | NA 1250 | LI 1250 | NA 1250 | NI 1250 | NA 1250 | ND | | ND | |
| Ethyl cinnamate | Alkene ester with aryl | 12.5-1250 | NI 1250 | NA 1250 | NI 1250 | NA 1250 | NI 1250 | NA 1250 | NI 1250 | NA 1250 | ND | | ND | |
| Farnesal mixture of isomers | | 12.5-125 | NI 125 | NA 125 | MI 12.5 | NA 125 | MI 125 | NA 125 | NI 125 | NA 125 | ND | | ND | |
| Farnesol | | 125-1250 | NI 1250 | NA 1250 | NI 1250 | NA 1250 | NI 1250 | NA 1250 | NI 1250 | NA 1250 | ND | | ND | |

Tables abbreviations:
*A—*A. alternata*, B—*B. cinerea*, S—*S. rolfsii*, P—*P. digitatum*, F—*F. oxysporum* f. sp. *radicis-cucumerium*, and R—*R. solani*. Not all test fungi were examined in all concentrations in the range.
I—Inhibition i.e., the minimal concentration (ppm) that inhibited the growth of the test fungi indicated by the coresponding letters relative to a non exposed control
M—Mortality i.e., the minimal concentration (ppm) that killed the fungus.
SI—Strong inhibition - 100% of growth inhibition compared to control.
MI—Medium inhibition - 76-99% of growth inhibition, e.g., 25 MI means that the growth was inhibited by 76-99% compared to control at a concentration of 25 ppm.
LI—Low inhibition - 51-75% of growth inhibition compared to control.
NI—<50% growth inhibition
ND—Not determined
NA—Not applicable, i.e., the fungus was still viable in the highest concentration tested.

Figure 2A:
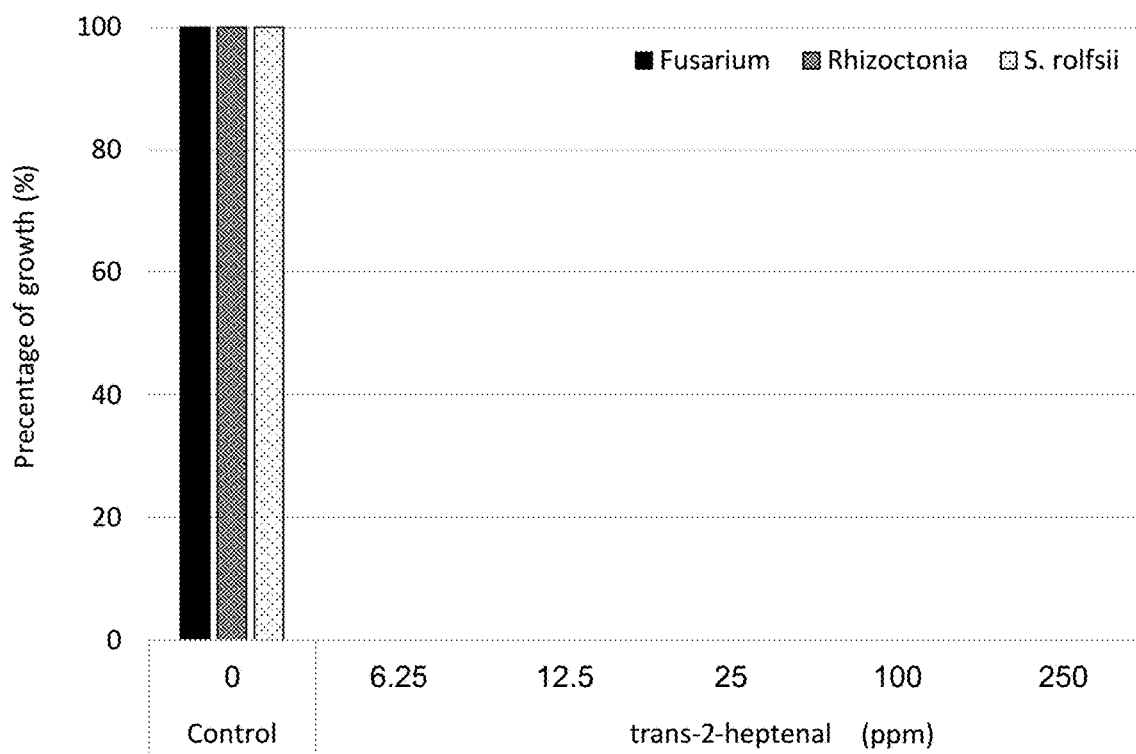
FIGS. 2A-2E are vertical bar graphs showing fungi growth after treatment with different compounds and their corresponding concentrations (graphs demonstrate growth percentages vis-à-vis a control bar; 2A-2E). In 2A, 2B, and 2E, each triplet of bar graphs refers to *Fusarium*, Rhzoctonia, and *S. rolfsii* (from left to right); In 2C and 2D each quartet of bar graphs refer to *A. alternata*, *B. cinerea*, *S. rolfsii*, and *P. digitatum* (from left to right).

As shown in FIG. 2A and in Table 2, treatment with trans-2-heptenal completely inhibited the fungi growth at concentrations of 6.25-25, dependent on the fungus tested, and fungi were not viable when concentrations of 6.25-125 ppm were administered.

Figure 2B:
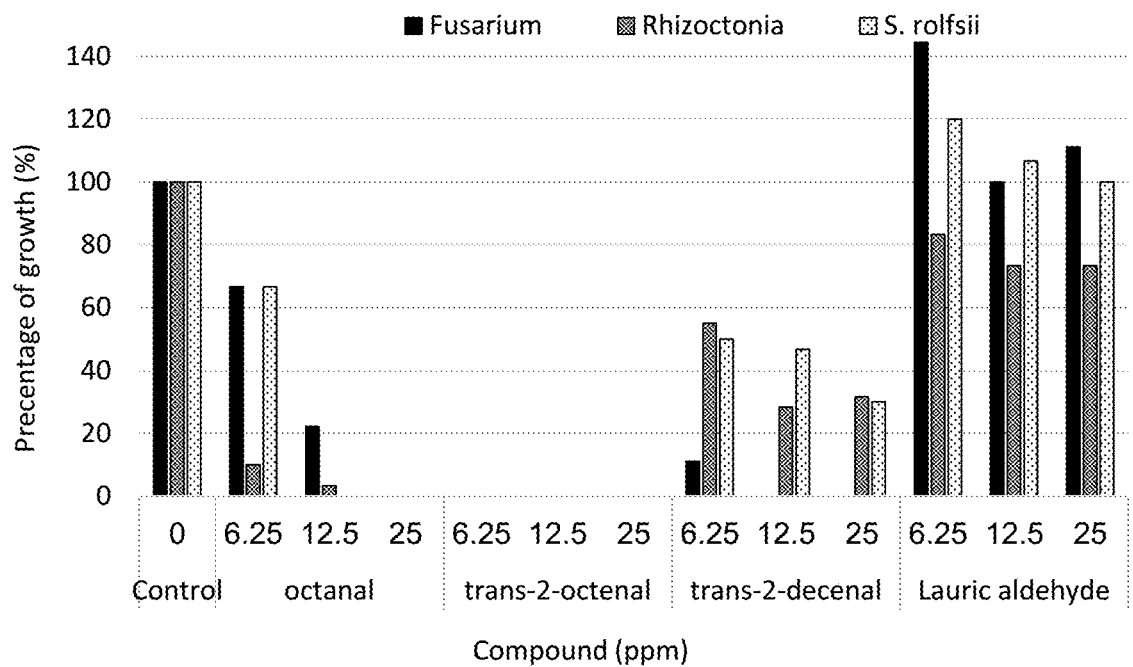

As shown in FIG. 2B and in Table 2, treatment with trans-2-octenal (a C8 alkenyl aldehyde) completely inhibited the fungi growth and killed the fungi in treatment concentrations of 6.25-50 ppm. Upon treatment with the same concentrations, octanal (a C8 saturated aldehyde) had less fungicidal efficiency, demonstrating the importance of the alkene structural feature. Moreover, the fungicidal activity declined when the hydrocarbon chain was longer than C8 as shown by the lower activity of both trans-2-decenal and Lauric aldehyde (a C10 and a C12 alkene aldehyde, respectively).

Figure 2C:
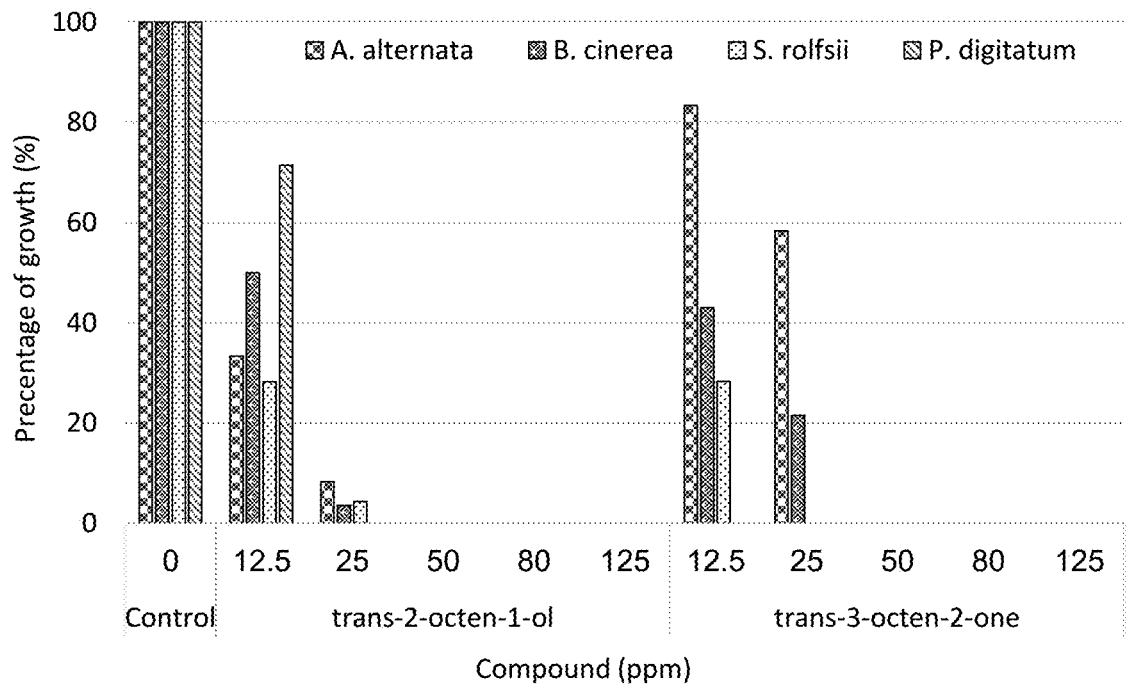
Figure 2D:
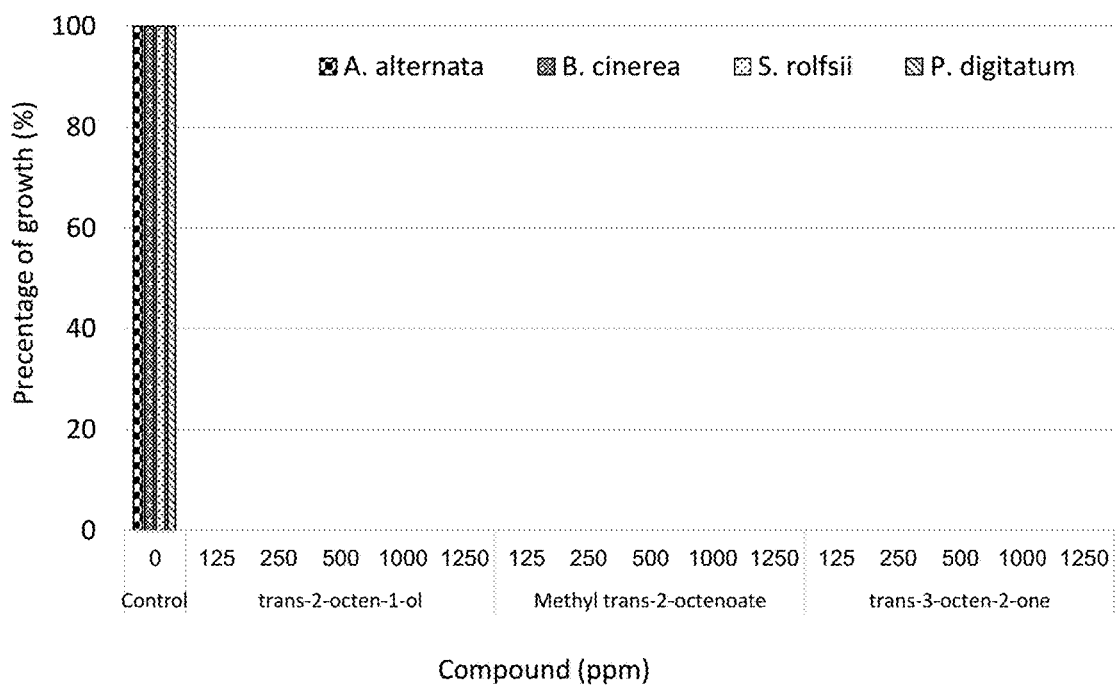

The comparison between different types of alkenes presented in FIGS. 2A-2D and Table 2 showed that alkenes with different moieties such as methyl or cyano moiety (FIG. 2E), had appreciably lower fungicidal activity. Trans-2-octen-1-ol, an alkene bearing instead of the aldehyde group, an hydroxyl group, and the alkene ketone trans-3-octen-2-one, completely inhibited fungi growth at concentrations of 50 ppm, as shown in FIG. 2C. Furthermore, as shown in FIG. 2D, an alkene with an ester moiety, methyl trans-2-octenoate, also completely inhibited the fungi growth at 125 ppm.

Figure 2E:
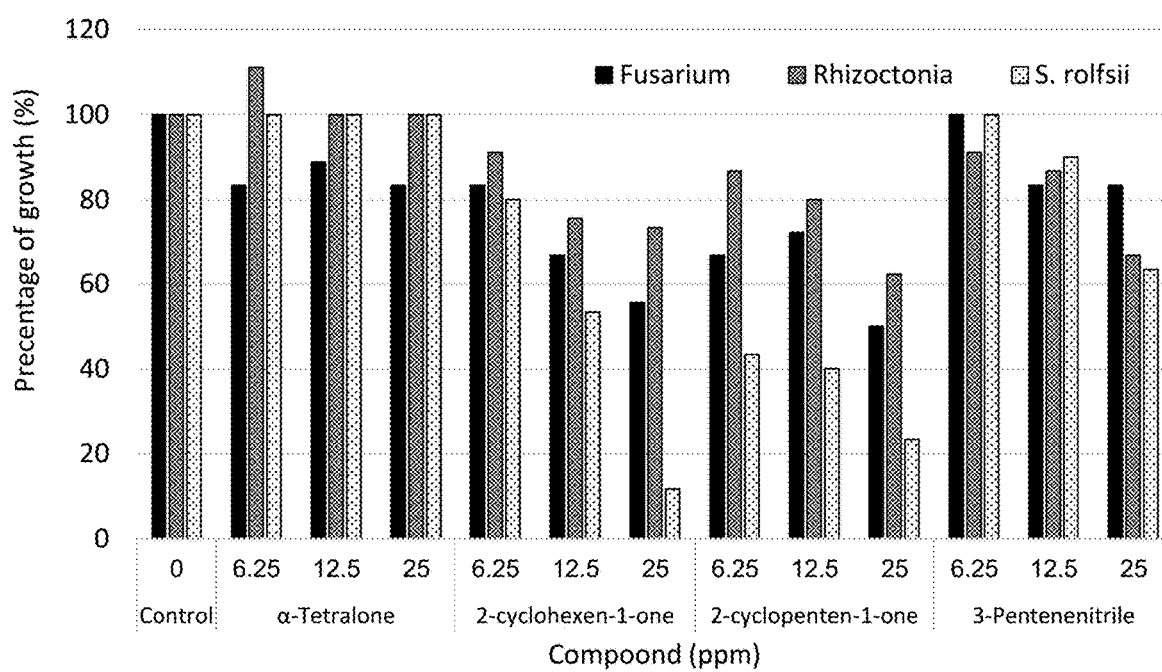

FIG. 2E illustrates the fact that the cyclic ketones, 2-cyclo-penten-1-one and 2-cyclohexen-1-one, had fungicidal activity, to some extent, and that the addition of an aryl group in α-tetralone further reduced fungicidal activity.

Taken together, these results demonstrate that aliphatic alkene aldehydes such as trans-2-heptenal and trans-2-octenal are consistently more potent fungicides even at 6 ppm than alkenes with ketone, ester, hydroxy or cyano moieties.

Example 3

Alkene Carbonyls and Cyclic Ketones Phytotoxicity

Materials and Experimental Methods

In exemplary procedures, the phytotixicity of trans-2-octenal and 2-cyclopenten-1-one was examined in triplicates for each concentration: 250, 1,000, 4,000, and 20,000 ppm compared to control. Tomato plants with 100 g of soil in each container were exposed to 1 g of perlite particles with the compound.

Results

FIGS. 3A-3E illustrate no phytotoxicity of trans-2-octenal after one day from treatment with various concentrations: 0 ppm or control (FIG. 3A), 250 ppm (FIG. 3B), 1,000 ppm (FIG. 3C), 4,000 ppm (FIG. 3D), and 20,000 ppm (FIG. 3E).

FIG. 4 illustrates that whereas there was no phytotoxicity of 250 ppm 2-cyclopenten-1-one, treatment with 1,000 ppm, 4,000 ppm, and 20,000 ppm were phytotoxic to the tomato plants after one day. Table 3 summarizes theses results.

TABLE 3

| Concentration (ppm) | trans-2-octenal | 2-cyclopenten-1-one |
|---|---|---|
| 0 | No phytotoxicity | No phytotoxicity |
| 250 | No phytotoxicity | No phytotoxicity |
| 1,000 | No phytotoxicity | Low phytotoxicity |
| 4,000 | No phytotoxicity | Medium phytotoxicity |
| 20,000 | No phytotoxicity | Strong phytotoxicity |

Example 4

Anti Phytopathogenic Activity of Trans-2-Octenal

Figure 5:
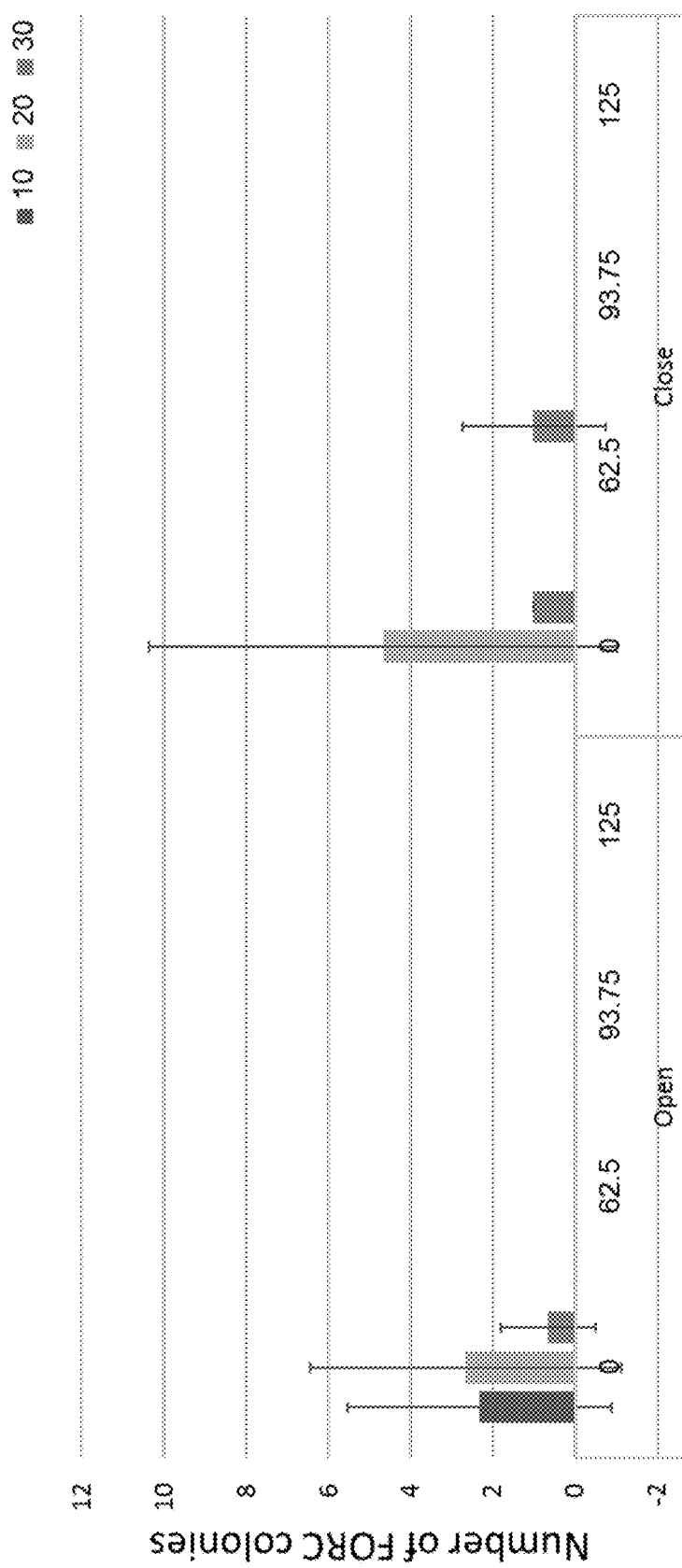
FIG. 5 is a vertical bar graph showing the effect of trans-2-octenal on *Fusarium oxysporum* f. sp. *radicis-cucumerinum* (FORC) in buckets. The numbers on the x-axis are the concentrations (ppm) of the compound. Under close conditions, the buckets were covered tightly with a plastic sheet in order to prevent possible evaporation of the tested compounds. The numbers on the y-axis are the average number of colonies that were viable after the treatment. The different colors of the columns indicate different depth of sampling in the soil (in cm).

The activity of trans-2-octenal was examined against phytopathogenic fungi and weeds. The experiment was performed in large buckets (110 L), which bottoms were removed, and therefore the loam in the bucket was continuous with the ground. The soil was inoculated one day prior the application of the compound. Soil inoculation was performed as follows: spores of Fusarium oxysporum f sp. radicis-cucumerinum (FORC) were collected from culture plates and 25 mL of spore suspension at concentration of $9 \times 10^5$ was mixed with 10 L of tap water and then poured on the soil of each bucket. In the next day, trans-2-octenal, at concentrations of 62.5, 93.75, and 125 ppm, was mixed with 10 L tap water and poured on the pre-inoculated soil in the buckets. Half of the buckets were sealed with nylon while the other half remained open. Five days later, soil samples from three different depths (10, 20, and 30 cm) were taken from each bucket for fungal isolation and determination of fungal survival. For this purpose, 1 g of soil sample was suspended in 9 mL sterile double distilled water (ddH$_2$O) and mixed vigorously, before plating 100 μL on potato dextrose agar plates (PDA) (Acumedia, Lansing, Michigan, USA) amended with tetracycline (tet) at 12.5 μg/mL. After 3 days, the number of colonies was counted. As shown in FIG. 5, concentration of 62.5 ppm was sufficient to eliminate FORC under open conditions in all depths examined. Similar results were obtained at close condition, except at depth 30 cm at concentration of 62.5 ppm.

Figure 6:
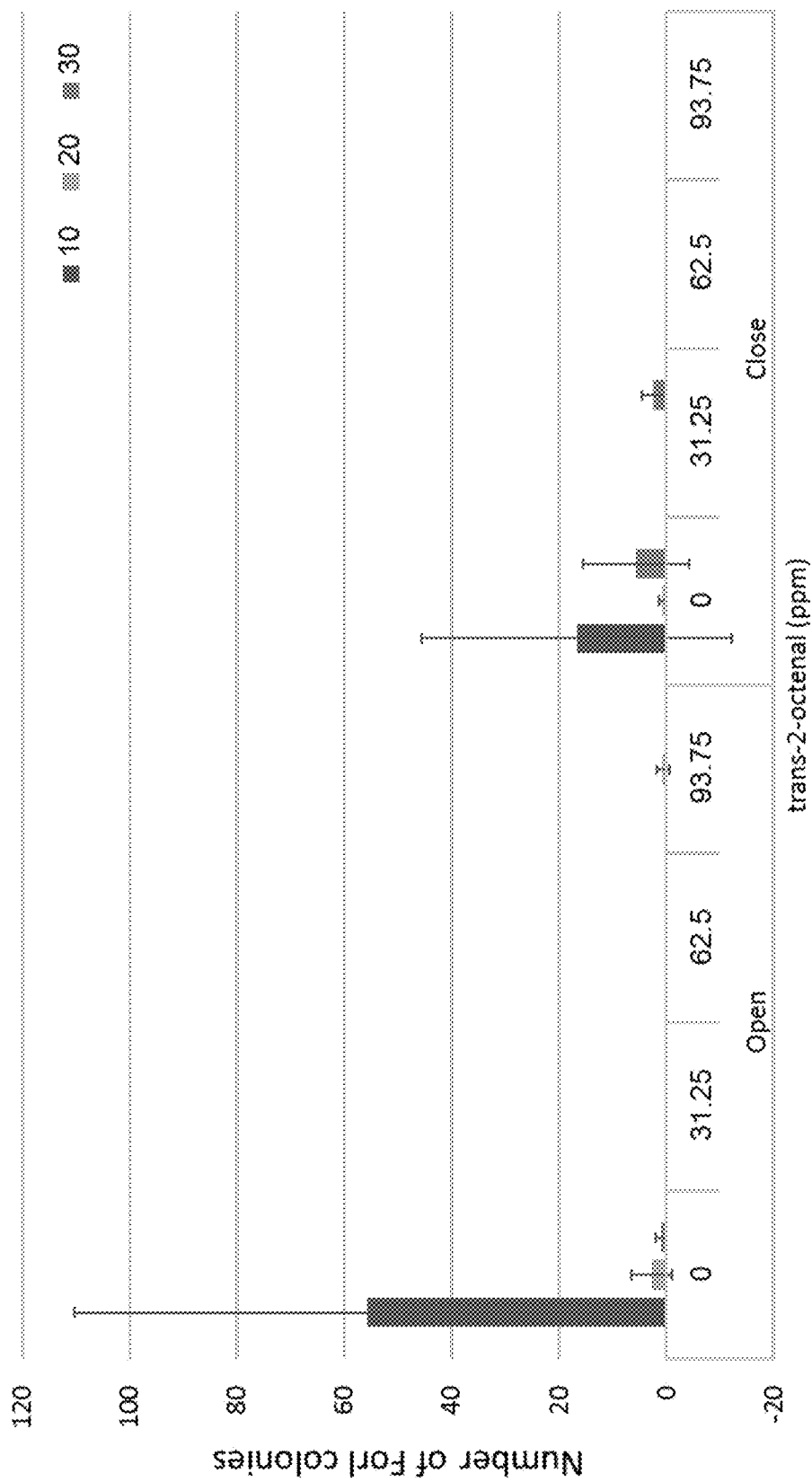
FIG. 6 is a vertical bar graph showing the effect of trans-2-octenal on *Fusarium oxysporum* f. sp. *radicis-lycopersici* (Forl) in buckets. The numbers on the x-axis are the concentrations (ppm) of the compound. The numbers on the y-axis are the average number of colonies that were viable after the treatment. The different colors of the columns indicate different depth of sampling in the soil (in cm).
Figure 7:
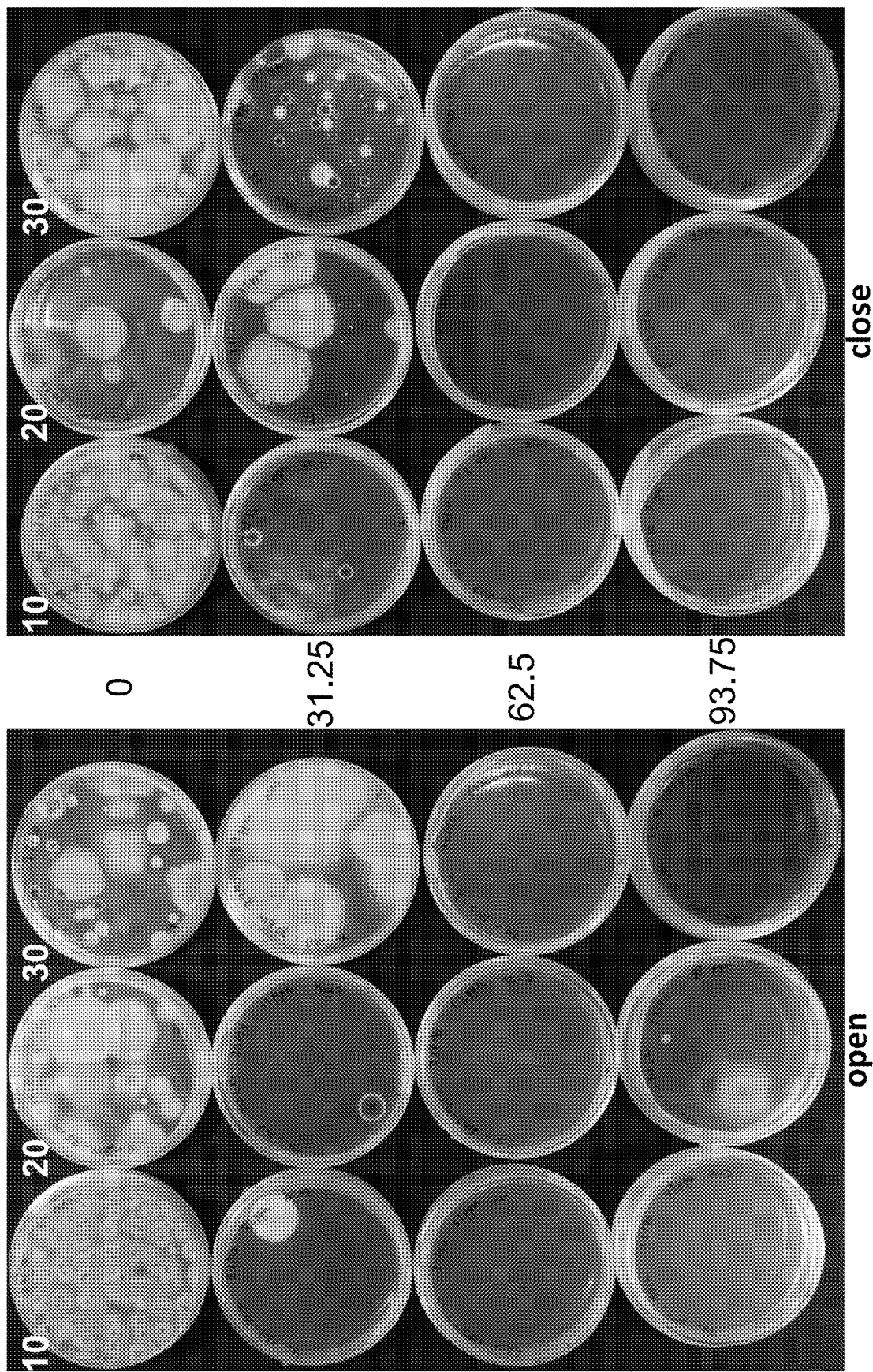
FIG. 7 is a photographic image of culture plates showing the effect of trans-2-octenal on Forl in buckets. Each row represents different concentration (0, 31.25, 62.5, and 93.75 ppm) of trans-2-octenal. Different columns represent the depth (10, 20, and 30 cm) of the sampling. The left part of the figure represents 'open' condition, and the right part of the figure represents 'close' conditions. The plates were incubated for 4 days at 25° C. before observation.

The experiment was repeated with the following modifications: different phytopathogenic fungus—Fusarium oxysporum f sp. radicis-lycopersici (Forl), lower concentrations—31.25, 62.5, and 93.75 ppm, and the application of the compound was done using the irrigation system. As shown in FIG. 6, elimination of Forl was achieved already at concentration of 31.25 ppm under open and close conditions, except at the depth of 30 cm in the lowest concentration in the close condition. FIG. 7 demonstrates the culture plates of the samples isolated from the treated soil. As shown in FIG. 7, most of fungal growth (both Forl and other soil-borne fungi), occurred in the absence of trans-2-octenal. Some growth (not of Forl) was detected at concentration of 31.25 ppm, whereas at higher concentrations, in all the depth examined, most of the culture plates were sterile from fungal growth.

Figure 8:
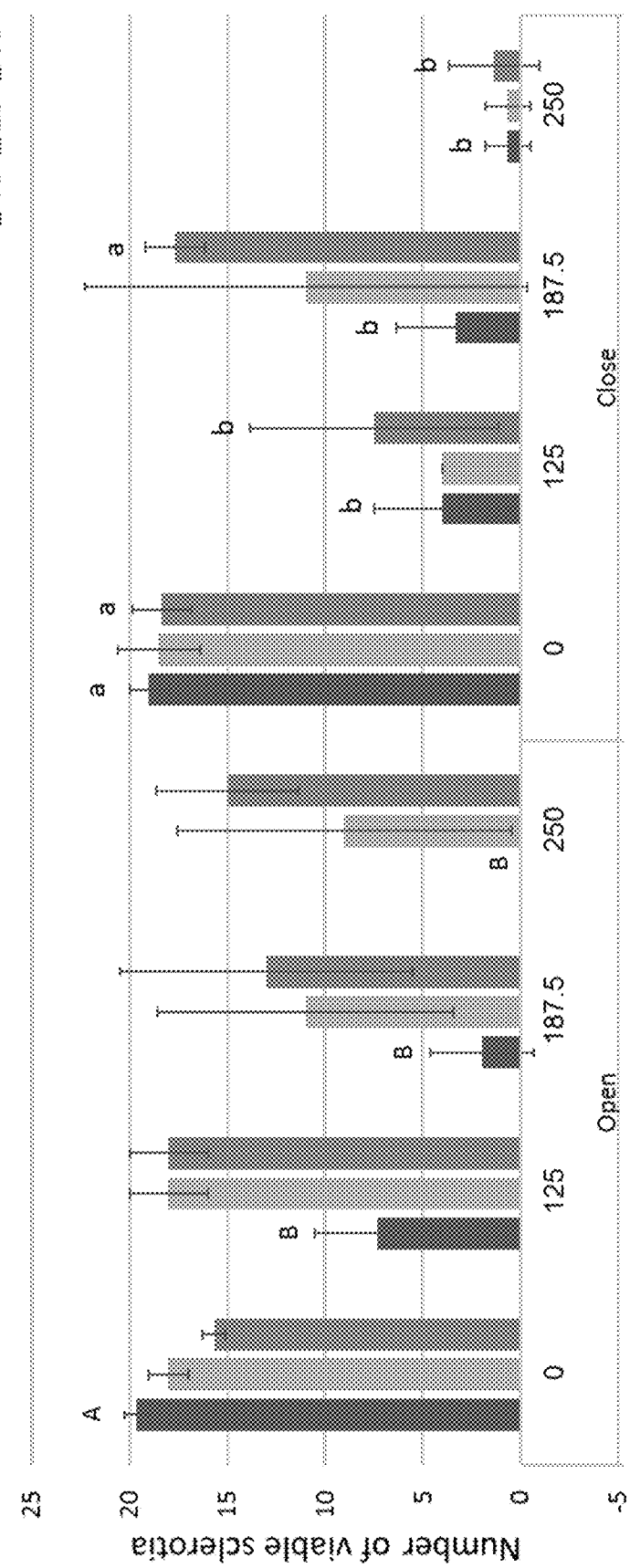
FIG. 8 is a vertical bar graph showing the effect of trans-2-octenal on *Sclerotium rolfsii* sclerotia, in buckets. The numbers on the x-axis are the concentrations (ppm) of the compound. The numbers on the y-axis are the average number of sclerotia that were viable after the treatment. The different colors of the columns indicate different depth in which the sclerotia were buried in the soil (in cm). The results were subjected to analysis of variance followed by the Tukey-Kramer multiple comparison test; different letters above the bars indicate a significant difference between samples at $p \leq 0.05$. The analysis was performed on each depth separately.

Similar experiment was carried out with Sclerotium rolfsii as the phytopathogen fungus. The experiment was performed as above with the following modifications: 50 sclerotia of S. rolfsii were inserted into paper tea-bags and warped with nylon tights. Each bucket contained 9 tea-bags, 3 for each depth of 10, 20, and 30 cm. After burying the tea bags, the soil was watered with 10 L of tap water. In the next day, trans-2-octenal, at concentrations of 125, 187.5, and 250 ppm, was mixed with 10 L tap water and poured on the pre-inoculated soil in the buckets. For determination of fungal survival, 20 sclerotia from each tea bag were placed in PDA+tet plates. Hyphal growth was detected after 2 days incubation at 25° C. As shown in FIG. 8, both under open and close conditions, the viability was reduced significantly at the depth of 10 cm. However, only under close conditions, significant effect was detected also at the depth of 30 cm in the highest concentration (250 ppm).

Figure 9A:
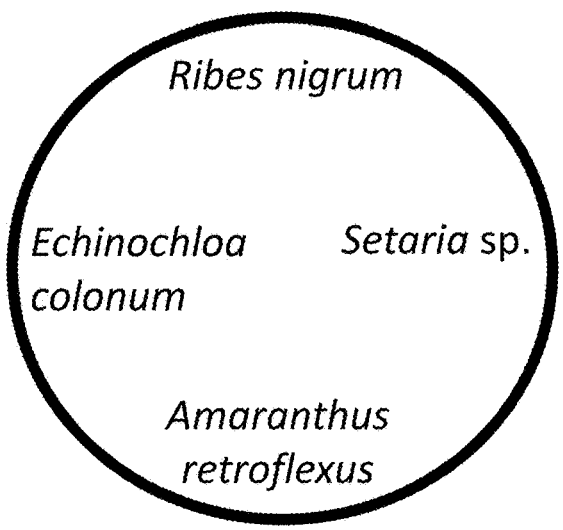
FIGS. 9A-9D are a scheme and photographic images showing the effect of trans-2-octenal on weeds in buckets. Ten seeds of each weed type were sown in the soil in order as indicated (9A). One (9C) or 4 (9D) days post sowing, 125 ppm of trans-2-octenal was mixed with 10 L of water and poured on the soil. The buckets were left open and estimation of seed germination was performed 27 days post sowing. Control is also shown (9B).
Figure 9B:
Figure 9C:
Figure 9D:
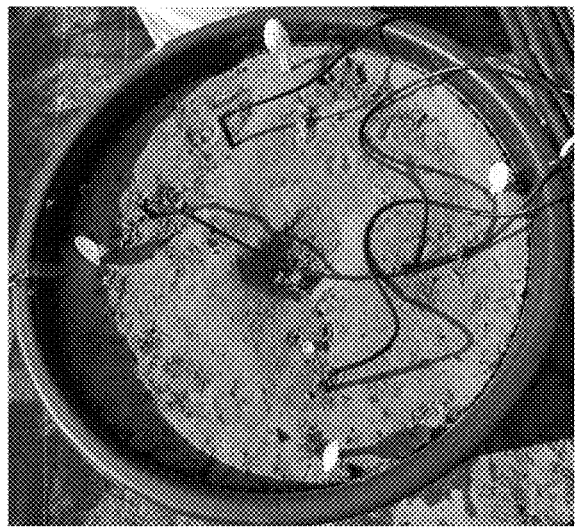
Figure 10A:
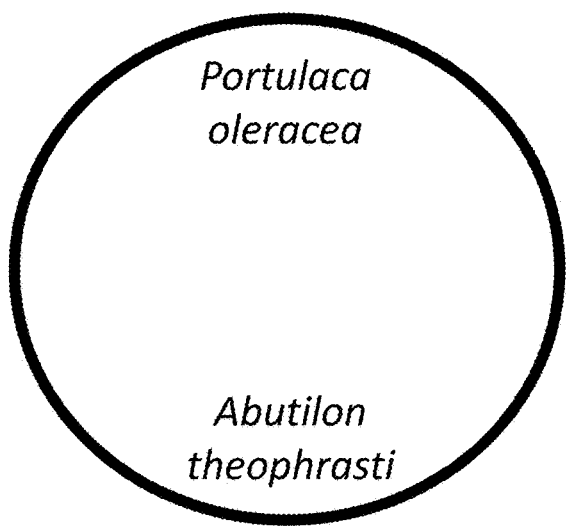
FIGS. 10A-10D are a scheme and photographic images showing the effect of trans-2-octenal on weeds in buckets. Ten seeds of each weed type were sown in the soil in order as indicated (10A). One (10C) or 4 (10D) days post sowing, 125 ppm of trans-2-octenal was mixed with 10 L of water and poured on the soil. The buckets were left open and estimation of seed germination was performed 27 days post sowing. Control is also shown (10B).
Figure 10B:
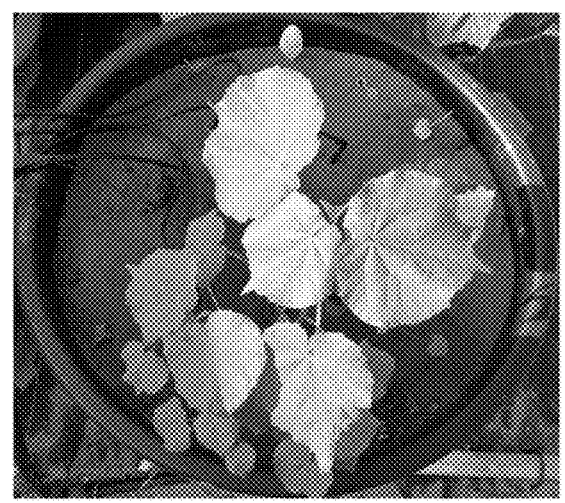
Figure 10C:
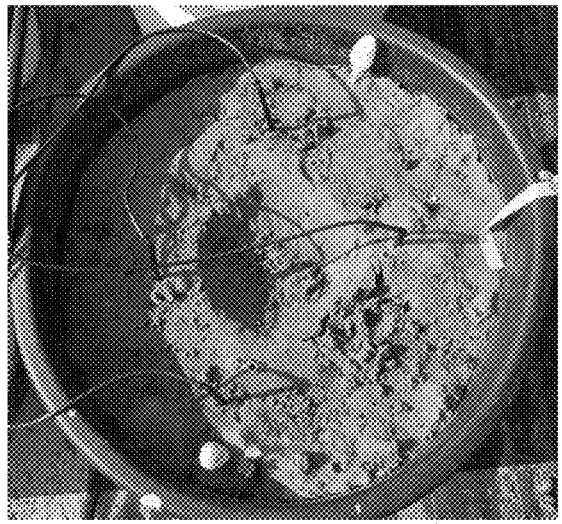
Figure 10D:
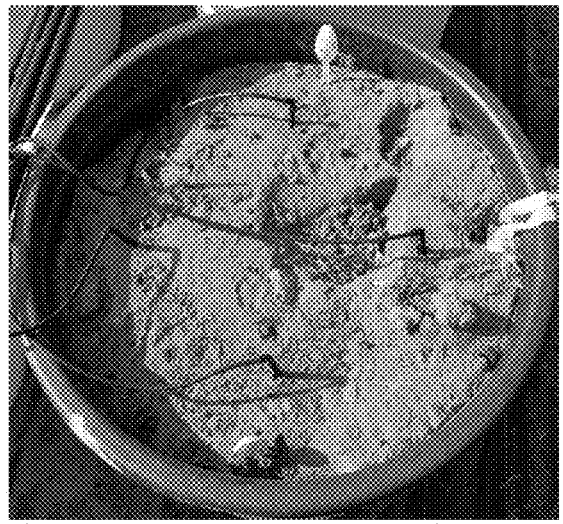
Figure 11A:
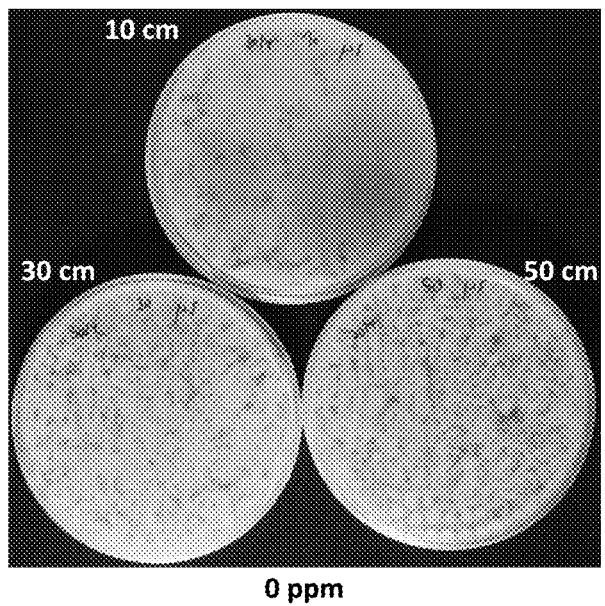
FIGS. 11A-11B are photographic images of culture plates showing the effect of trans-2-octenal on chlamydospores of Forl in sandy soil in an open field. Soil samples from different depths were cultured on PDA+tet (antibiotic) culture plates and grown for 3 days at 25° C. (11A) is control (0 ppm), and (11B) demonstrates the application of 54 ppm of trans-2-octenal. The numbers on the figure represent the depth (in cm) of sampling.
Figure 11B:
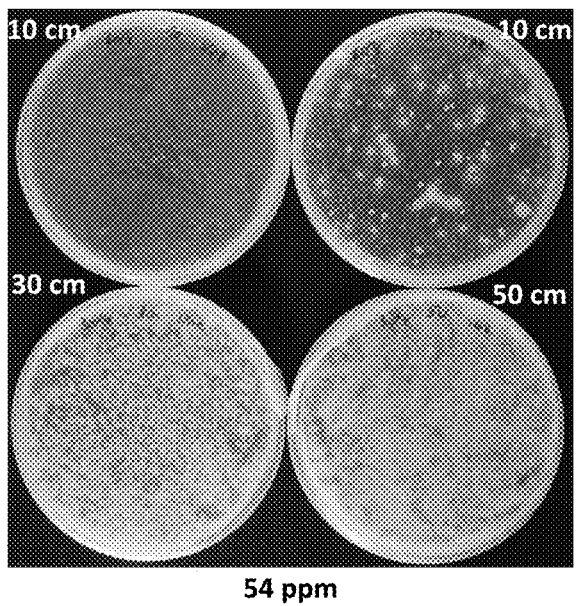
Figure 14D:
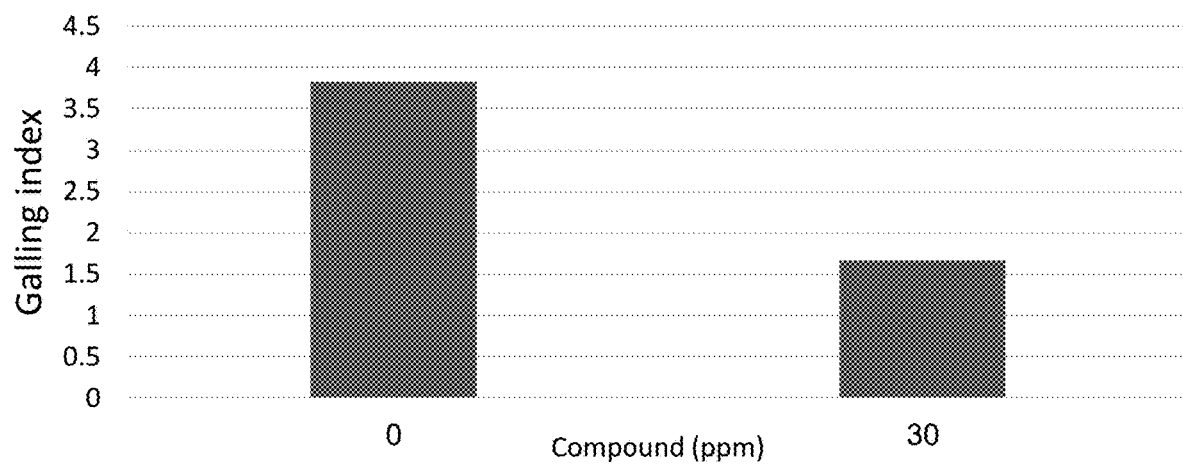

The effect of trans-2-octenal on weeds was also examined using these buckets. Ten seeds each of Setaria sp., garden purslane (Portulaca oleracea), China jute (Abutilon theophrasti), blackcurrant (Ribes nigrum), rough pigweed (Amaranthus retroflexus), and Echinochloa colonum, were sown in the buckets filled with loam soil. The buckets were watered with 10 L of tap water. One or four days later trans-2-octenal, at concentration of 125 ppm, was implemented by mixing it with 10 L tap water and pouring on the treated soil. The effect on weeds viability was determined 27 days post sowing. As show in FIGS. 9A-9D, application of the compound 1 days after sowing resulted in elimination of blackcurrant (Ribes nigrum) and rough pigweed (Amaranthus retroflexus; FIG. 9C). However, full elimination of Setaria sp. and Echinochloa colonum, was achieved only when the application was performed 4 days post sowing (FIG. 9D). As shown in FIGS. 10A-10D, application of trans-2-ocetnal 1 and 4 days post sowing resulted in full elimination of China jute (Abutilon theophrasti; FIGS. 10C-10D). Nonetheless, the weed garden purslane (Portulaca oleracea) was not viable under control conditions (FIG. 10B).

An experiment in a larger scale was performed directly in sandy soil (with no buckets as mediators). In this experiment, an emulsions of trans-2-octenal (25% active compound) such as those described in Example 9 were used. The soil was inoculated with chlamydospores of Forl and sclerotia of S. rolfsii. Five gram of soil, highly inoculated with chlamydospores were wrapped in nylon tights and buried in the field at depths of 10, 30, and 50 cm. Tea bags containing 50 S. rolfsii sclerotia were prepared as described above and buried similarly. After 6 days, trans-2-octenal emulsion, at concentration of 54 ppm (active compound) was applied using the irrigation system. The same conditions were applied to a control plot except that the plot was irrigated with tap water without the compound. The plots were left open during the time of the experiment. After 6 days, the pathogens were removed from the soil and their viability was examined using PDA+tet culture plates. FIGS. 11A-11B and FIGS. 12A-12B demonstrate the effect of trans-2-octenal on Forl and S. rolfsii, respectively. As shown in these figures, elimination of both phytopathogenic fungi occurred at the lowest depth of 10 cm. No elimination of these fungi occurred in 30 and 50 cm depth. This result suggests that the disclosed compound was effective at 10 cm depth of sandy soils under said conditions.

The effect of trans-2-octenal was also examined on the weed *Solanum nigrum*. To this end, 20 seeds of this weed were put in tea bags and buried in sandy soil at the depth of 10 cm. Six (6) days later, 54 ppm of emulsion of trans-2-octenal were applied via the irrigation system. After additional 6 days the seeds were removed from the soil and sown in fresh loam pots. A control experiment was performed as above except that the seeds were irrigated with tap water without the compound. The viability of the seeds was evaluated after 6 days. As shown in FIG. 13A-13B, trans-2-octenal eliminated seeds viability.

Example 5

Nematocidic Activity of Trans-2-Octenal

The activity of trans-2-octenal against nematodes was examined in a greenhouse experiment using stage 2 juveniles of the rot-knot nematode *Meloidogyne javanica*. Loam soil was inoculated with ~3,700 *M. javanica* J2s. After 2 days, the inoculated soil was treated with 30 ppm of trans-2-octenal and incubated for additional 5 days. Then, susceptible tomato plants were planted, and allowed to grow in a growing chamber for 8 weeks. At the end of the experiment, the plants, along with their root systems, were harvested from their pots and evaluated for incidence of root galling. In addition, *M. javanica* eggs were extracted from each root and counted, and the number of eggs per gram root was calculated. As shown in FIGS. 14A-14D, trans-2-octenal reduced the galling index and the number of eggs per gram root. This result indicates trans-2-octenal has nematocidal activity.

Example 6

Nematocidic Activity of 2-Cyclohexen-1-One

Figures 15A, 15B, 15C:
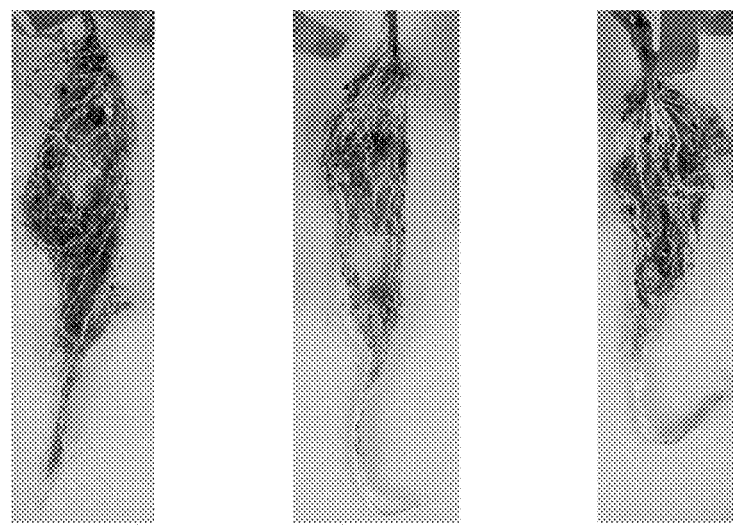
Figure 15D:
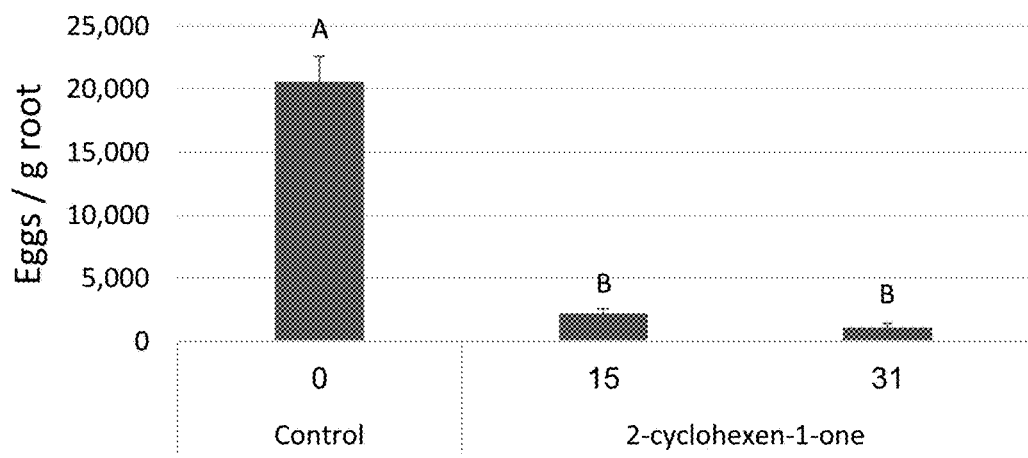

The activity of 2-cyclohexen-1-one against nematodes was examined in a greenhouse experiment using stage 2 juveniles of the rot-knot nematode *Meloidogyne javanica*. The experiment was performed as described for trans-2-octenal. Briefly, loam soil was inoculated with ~3,900 *M. javanica* J2s. After 2 days, the inoculated soil was treated with 15 or 31 ppm of 2-cyclohexen-1-one and incubated for additional 5 days. Then, susceptible tomato plants were planted, and allowed to grow in a growing chamber for 8 weeks. At the end of the experiment, the plants, along with their root systems, were harvested from their pots and evaluated for incidence of root galling. In addition, *M. javanica* eggs were extracted from each root and counted, and the number of eggs per gram root was calculated. As shown in FIG. 15, 2-cyclohexen-1-one was shown to be sufficient to reduce the galling index and the number of eggs per gram root already at 15 ppm. This result indicates 2-cyclohexen-1-one has nematocidal activity.

Example 7

Phytotoxicity Effects of Trans-2-Octenal

Figure 16C:
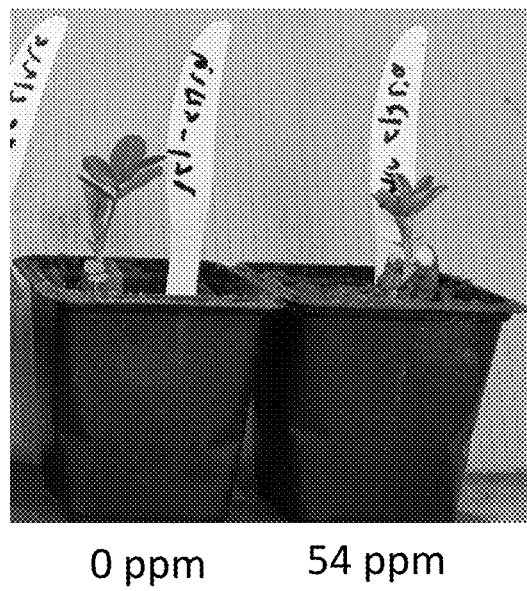
Figure 16D:
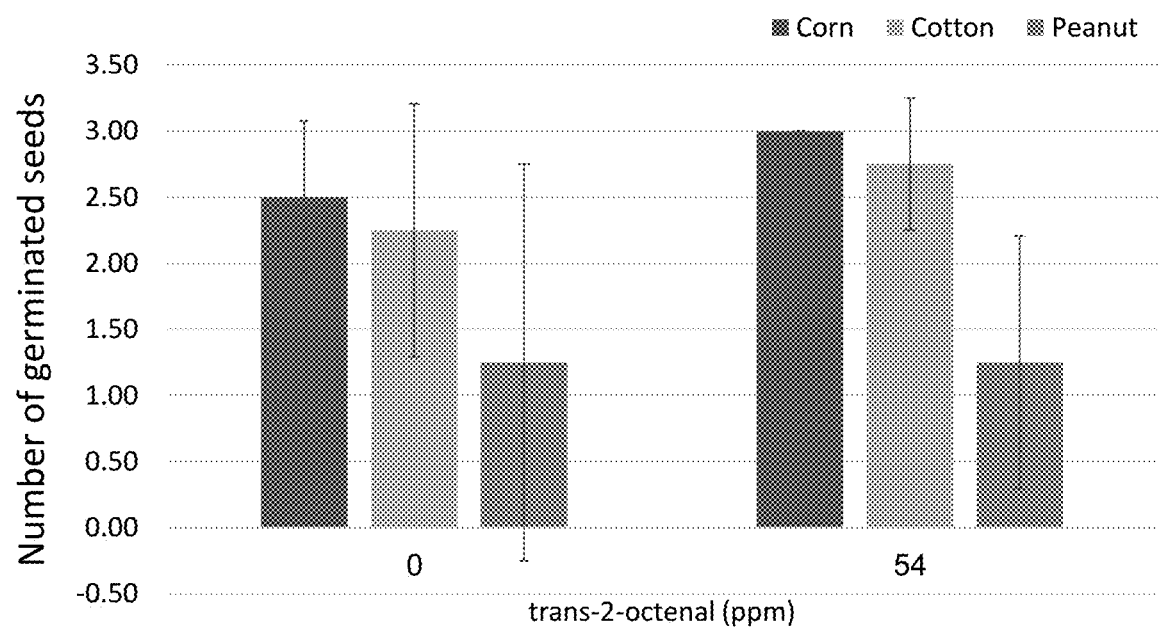
Figures 16E, 17A:
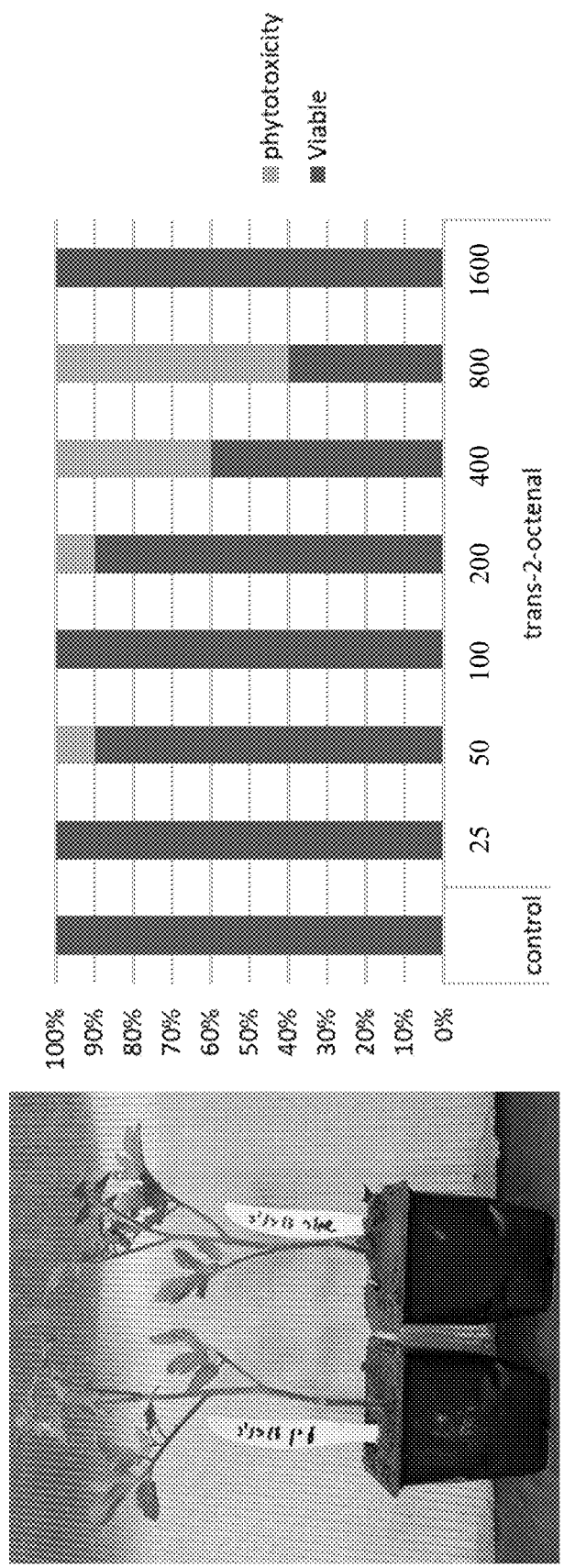

Sandy soil from a plot that was treated with 54 ppm of trans-2-octenal was removed to small pots in which either seeds of corn, cotton, and peanut were sown (FIGS. 16A-16C) or tomato seedlings were planted therein (FIG. 16E). Nine days later, the number of seeds that germinated in control, untreated sandy soil, did not differ significantly from the number of seeds germinated in treated soil (FIG. 16D). Moreover, there was no significant difference in the growth of the tomato seeding between treated and untreated soil (FIG. 16E).

Figure 17B:
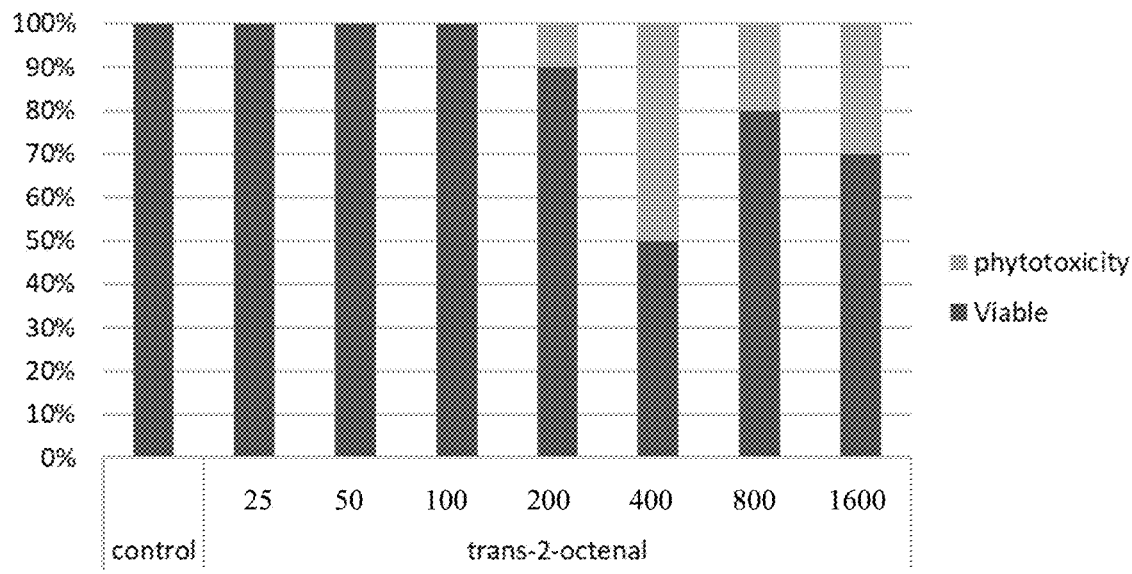
Figure 17C:
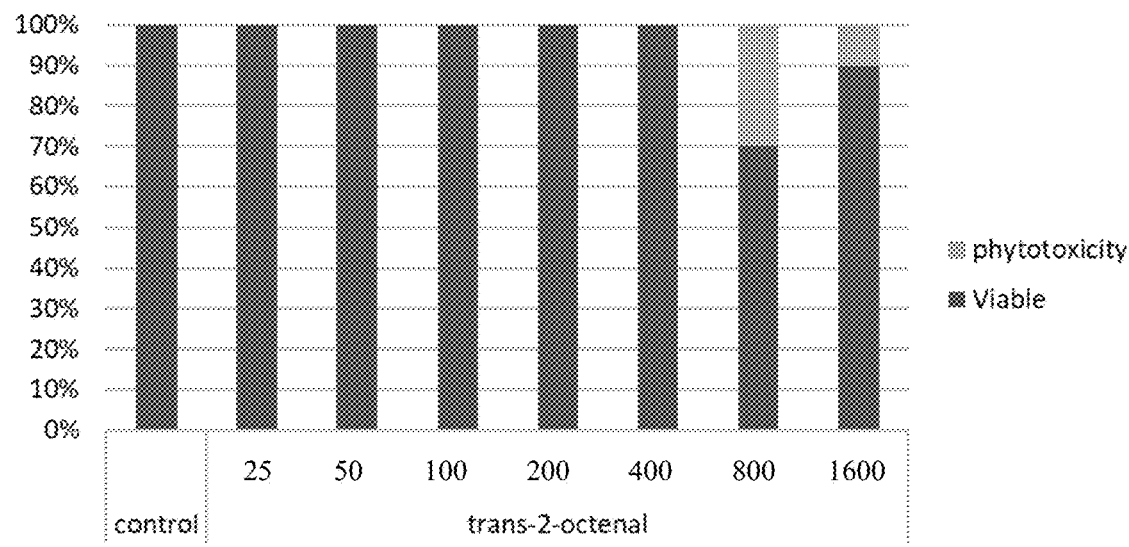
Figures 17D, 17E:

An experiment in a larger scale was performed in loam soil in which the seedling were planted directly in the treated plot. The soil was treated with 0, 25, 50, 100, 200, 400, 800, and 1,600 ppm of emulsion of trans-2-octenal. The compound was applied using the irrigation system. A day later, tomato seedling strains Ikram and Abigail and lettuce seedling strain Raviv (10 seedlings each) were planted into the treated soil of each concentration. Eleven days later, the number of viable seedlings was counted. As shown in FIGS. 17A-17E, significant phytotoxic effect occurred at the concentration of 400 ppm for lettuce (FIG. 17A) and tomato strain Abigail (FIG. 17B), whereas tomato strain Ikram was more resistant, displaying phytotoxic effect at a concentration of 800 ppm (FIG. 17C).

Example 8

Phytotoxicity Effects of 2-Cyclohexen-1-One

The phytotoxic effect of 2-cyclohexen-1-one in pots was examined on tomato seedlings strain Ikram. Pots (9-10 repetitions) were filled with 500 g of loam soil pretreated with 2-cyclohexen-1-one at final concentration of 0, 50, and 60 ppm. Then, tomato seedling was planted in each pot and allowed to grow for 9 days. The phytotoxic effect was evaluated by counting the number of live seedling and measuring their heights. As shown in Table 4, phytotoxic effect was obtained only at concentration of 60 ppm.

TABLE 4

Phytotoxic effect of 2-cyclohexen-1-one on tomato seedlings

| Concentration (ppm) | Seedling height (Mean ± SD) (cm) | % Viability |
| --- | --- | --- |
| 0 | 21 ± 2 | 100 |
| 50 | 21 ± 3 | 100 |
| 60 | 16 ± 2 | 67 |

The phytotoxic effect of 2-cyclohexen-1-one was also examined on peanut seeds. The concentrations tested were: 0, 10, 20, and 40 ppm, 3 pots for each concentration. After mixing the loam soil with 2-cyclohexne-1-one, three peanut seeds were sown in each pot and let to grow for 16 days. The number of germinated seeds was counted, and the results are summarized in Table 5.

TABLE 5

Phytotoxic effect of 2-cyclohexen-1-one on peanut seeds

| Concentration (ppm) | Number of germinated seeds | % Viability |
| --- | --- | --- |
| 0 | 9 | 100 |
| 10 | 8 | 89 |
| 20 | 9 | 100 |
| 40 | 8 | 89 |

Figure 18A:
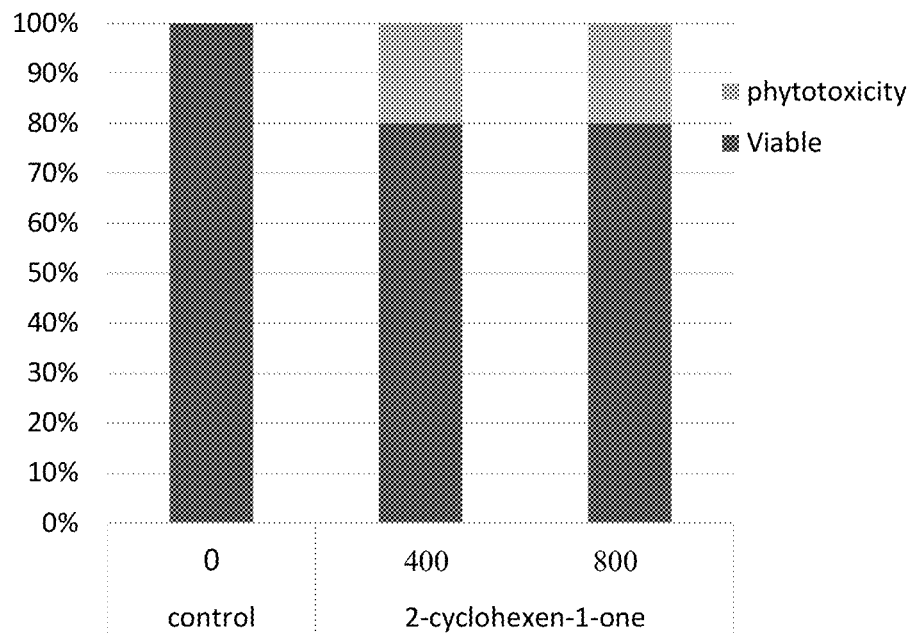
FIGS. 18A-18E are vertical bar graphs and representative photographic images showing the results of phytotoxicity test of 2-cyclohexen-1-one in the field. Seedling of tomato strain Ikram (18A), tomato strain Kilates (18B), and lettuce (18C) were planted one day after application of 2-cyclohexen-1-one. The viability of the seedlings was estimated 3 days post planting. (18D and 18E) are representative photographic images of seedlings which were grown in the absence (18D) or presence (18E) of 2-cyclohexen-1-one at concentration of 800 ppm.
Figure 18B:
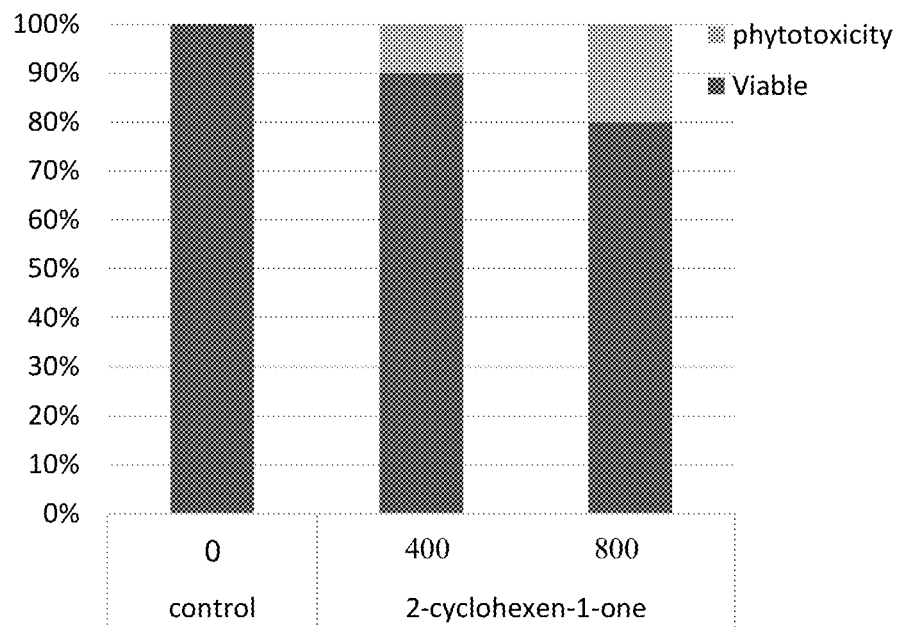
Figure 18C:
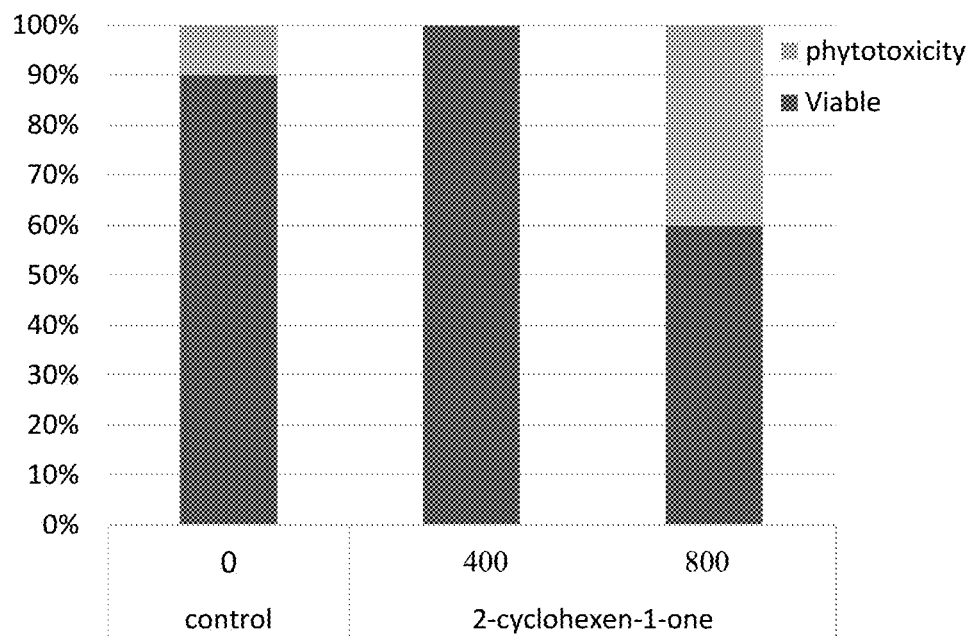
Figure 18D:
Figure 18E:
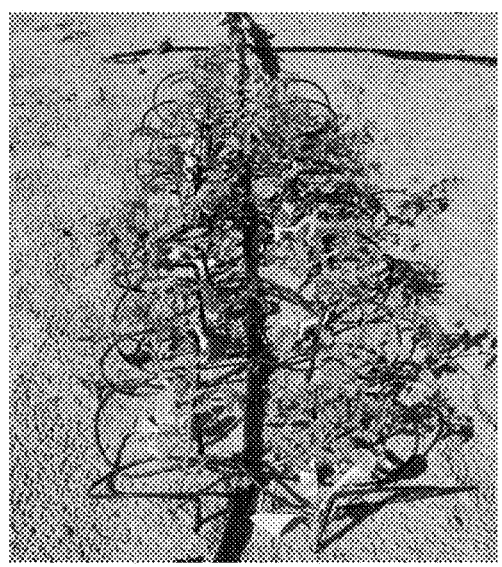

A larger scale field experiment was performed in loam soil in which the seedling were planted directly in the treated plot. The soil was treated with 0, 400 and 800 ppm of emulsion of 2-cyclohexene-1-one. The compound was applied using the irrigation system. A day later, tomato seedling strains Ikram, and Kilates and lettuce seedling strain Raviv (10 seedlings each) were planted into the treated soil of each concentration. Three (3) days later, the number of seedlings was counted. As shown in FIGS. 18A-18E, phytotoxic effect occurred at a concentration of 400 ppm for both tomato strains (FIGS. 18A-18B), whereas lettuce was more resistant—displaying phytotoxic effect at 800 ppm of the compound (FIG. 18C). Lower concentrations (25-200 ppm) were applied as well, however with no phytotoxic effect.

Example 9

Odour Suppression of Trans-2-Octenal

Trans-2-octenal is characterized by a highly unpleasant odour. Accordingly, the inventors sought for potential odour suppressants which would decrease the effect of the intrinsic smell while maintaining trans-2-octenal fungicidic and nematocidic activities.

The inventors examined a variety of alternative organic solvents as co-formulants of trans-2-octenal without achieving the desired effect. Thereafter, the inventors tested isoamyl acetate (IA), which possesses a characteristic pleasant banana smell and is a readily available commodity product. Several ratios of IA to trans-2-octenal were tested in order to examine whether and at which point the effect of the trans-2-octenal odour became tolerable. The results are summarized hererinbelow (Table 6).

TABLE 6

The effect of varying ratios of IA and trans-2-octenal on the odour of the mixture

| IA to trans-2-octenal (v/v) | Odour |
|---|---|
| 1:1 | trans-2-octenal, strong, unpleasant |
| 2:1 | Predominantly IA, trans-2-octenal barely noticeable, pleasant |
| 3:1 | IA, pleasant |

The inventors then sought to obtain on one hand an odourless formulation which on the other hand comprises the highest possible active ingredient concentration (e.g., trans-2-octenal). Based on the above results, the inventors formulated trans-2-octenal with IA as a solvent in a 2:1 ratio to trans-2-octenal, as summarized hereinbelow (Table 7).

TABLE 7

Formulation with odour suppressing solvent

| Material | % (w/w) |
|---|---|
| Trans-2-octenal | 25 |
| Dipropylene glycol | 8 |
| Linear alkylbenzenesulfonate salt based anionic surfactant | 4 |
| Ethoxylated Castor Oil based nonionic surfactant | 10 |
| Isoamyl acetate | 53 |

A comparison of the properties of the above odour-suppressed formulation was carried out with those of a conventional formulation which contained no odour suppressant, and comprised ingredients as specified hereinbelow (Table 8).

TABLE 8

Formulation without odour suppressing solvent

| Material | % (w/w) |
|---|---|
| Trans-2-octenal | 25 |
| Dipropylene glycol | 8 |
| Linear alkylbenzenesulfonate salt based anionic surfactant | 4 |
| Ethoxylated Castor Oil based nonionic surfactant | 10 |
| Fatty acid methyl ester solvent | 53 |

The comparison of properties of both formulations is shown hereinibelow (Table 9):

TABLE 9

Comparison of the properties of the formulations with and without odour suppressing solvent

| Item | Specifications | With IA | No IA |
|---|---|---|---|
| Appearance | Clear solution | Conforms | Conforms |
| Density (g/mL) | | 0.893 g/mL | 0.889 g/mL |
| OE concentration (g/L) | 25% | 25.02% | 25.20% |
| pH (1% dilution in water) | 4-10 | 4.44 | 4.69 |
| Emulsion stability in water | Stable | Conforms | Conforms |

With respect to fungicidic activity, when the inventors tested the effect of the composition comprising IA (i.e., 'odour suppressed') against target organisms in biological assays, the composition showed equivalent fungicidic activity to a control composition (e.g., No IA).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of killing a fungus or reducing growth thereof, comprising exposing a soil infested with the fungus to a non-phytotoxic fungicide effective amount of a composition comprising trans-2-octenal as the sole fungicide; wherein the non-phytotoxic fungicide effective amount is a concentration of trans-2-octenal of 1-300 ppm within said soil.

2. The method of claim 1, wherein the composition further comprises water.

3. The method of claim 1, further comprising a deodorizing compound.

4. The method of claim 3, wherein said compound and said deodorizing compound are at a ratio of at least 1:1.5 by weight.

5. The method of claim 3, comprising 40-70% by weight of said deodorizing compound.

6. The method of claim 2, further comprising a glycol ether solvent and one or more surfactant selected from an anionic surfactant, a nonionic surfactant, or a combination thereof, and wherein a weight ratio between said compound and said one or more surfactant is between 10:1 and 1:1.

7. The method of claim 1, wherein the soil pathogen is selected from the group consisting of: *Meloidogyne javanica, Aspergillus niger, Botrytis cinerea, Alternaria alternata, Sclerotium rolfsii, Rhizoctonia solani, Fusarium oxysporum* f sp. *Radicis-cucumerinum, Lasiodiplodia theobromas, Neoscytalidium dimidiatum, Talaromyces* spp., *Phoma tracheiphila, Colletotrichum* spp., *Verticillium* spp., *Pythium* spp., *Fusarium oxysporum* f sp. *radicis-lycopersici* (Forl) and *Penicillium digitatum* including any combination thereof.

8. The method of claim 5, wherein said aliphatic diol is selected from the group consisting of: 4-oxa-2,6-heptandiol, 2-(2-hydroxy-propoxy)-propan-1-ol, and 2-(2-hydroxy-1-methyl-ethoxy)-propan-1-ol.

9. The method of claim 6, comprising 5-15% by weight of said glycol ether.

10. The method of claim 6, wherein any one of: (i) said anionic surfactant is a linear alkylbenzene sulfonate; and (ii) said nonionic surfactant is an ethoxylated castor oil.

11. The method of claim 10, comprising (i) 2-10% by weight of said anionic surfactant, or (ii) 5-15% by weight of ethoxylated castor oil, or (iii) a combination thereof.

12. A method of killing a soil pathogen or reducing growth thereof, comprising exposing a soil infested with the soil pathogen to a composition comprising a pesticide effective amount of trans-2-octenal as the sole pesticide; wherein said exposing is at a non-phytotoxic amount of trans-2-octenal ranging between 1 and 300 ppm within said soil; and wherein the pesticide effective amount is a concentration of 0.5-2500 ppm in said composition.

13. The method of claim 12, wherein the compound is represented by Formula IV:

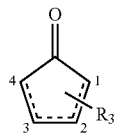

wherein the dashed bond represents at least one double bond between two adjacent carbons at positions 1 to 4, and R3 represents one to four substituents being independently at each occurrence selected from the group consisting of: hydrogen, halo, hydroxy, alkoxy, aryloxy, cycloalkyloxy, heterocyclyloxy, heteroaryloxy, formyl, —S(=O)R$^a$, —S(=O)2R$^a$, —C(=O)R$^a$, —C(=O)OR$^a$, wherein R$^a$ is independently at each occurrence alkyl, alkenyl, alkynyl, cycloalkyl, aryl, alkylaryl, heterocyclyl or heteroaryl; amino, alkylamino, dialkylamino, arylamino, diarylamino, alkylarylamino, cycloalkylamino, heterocyclylamino, heteroarylamino, amido, alkylamido, dialkylamido, arylamido, diarylamido, alkylarylamido, cycloalkylamido, heterocyclylamido, heteroarylamido, cyano, nitro, carboxyl, carboxyalkyl, carboxyaryl, or acyl.

14. The method of claim 12, wherein the compound is represented by Formula IV (a):

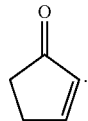

15. The method of claim 12, wherein the compound is represented by Formula V:

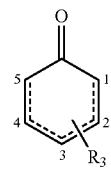

wherein the dashed bond represents at least one double bond between two adjacent carbons at position 1 to 5, and R3 represents one to five substituents being independently at each occurrence selected from the group consisting of: H, halo, heterocyclyl, heteroaryl, hydroxy, alkoxy, aryloxy, cycloalkyloxy, heterocyclyloxy, heteroaryloxy, formyl, —S(=O)R$^a$, —S(=O)2R$^a$, —C(=O)R$^a$, —C(=O)OR$^a$, wherein R$^a$ is independently at each occurrence alkyl, alkenyl, alkynyl, cycloalkyl, aryl, alkylaryl, heterocyclyl or heteroaryl; amino, alkylamino, dialkylamino, arylamino, diarylamino, alkylarylamino, cycloalkylamino, heterocyclylamino, heteroarylamino, amido, alkylamido, dialkylamido, arylamido, diarylamido, alkylarylamido, cycloalkylamido, heterocyclylamido, heteroarylamido, cyano, nitro, carboxyl, carboxyalkyl, carboxyaryl, or acyl.

16. The method of claim 15, wherein the compound is represented by Formula V(a):

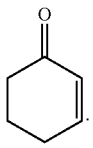

17. The method of claim 12, wherein said pestis a soil pathogen selected from the group consisting of: nematodes, fungi, microorganisms and weed, or any combination thereof.

18. The method of claim 12, wherein said soil pathogen is a fungus.

* * * * *